US012776929B2

(12) United States Patent
Starr et al.

(10) Patent No.: US 12,776,929 B2
(45) Date of Patent: Oct. 27, 2026

(54) SELF-CONFIGURATION OF BUS NODES IN A BUS SYSTEM OF AN AIRCRAFT

(71) Applicant: Archer Aviation Inc., San Jose, CA (US)

(72) Inventors: Rodrigo Rizzi Starr, Wessling (DE); Gabriel Ribas, Wessling (DE); Pedro Henrique Silva Miranda, Wessling (DE); Mert Kolayli, Wessling (DE)

(73) Assignee: Archer Aviation Inc., San Jose, CA (US)

( * ) Notice: Subject to any disclaimer, the term of this patent is extended or adjusted under 35 U.S.C. 154(b) by 39 days.

(21) Appl. No.: 18/381,768

(22) Filed: Oct. 19, 2023

(65) Prior Publication Data

US 2024/0137244 A1 Apr. 25, 2024
US 2024/0235885 A9 Jul. 11, 2024

(30) Foreign Application Priority Data

Oct. 19, 2022 (EP) .................................... 22202526

(51) Int. Cl.
*H04L 12/40* (2006.01)

(52) U.S. Cl.
CPC .................. *H04L 12/40006* (2013.01); *H04L 2012/40215* (2013.01); *H04L 2012/4028* (2013.01)

(58) Field of Classification Search
CPC ..... H04L 12/40006; H04L 2012/40215; H04L 2012/4028
See application file for complete search history.

(56) References Cited

U.S. PATENT DOCUMENTS 1,200,206 A * 10/1916 Lindemann ............... E04B 1/24 52/261
11,276,315 B1 * 3/2022 Moeykens .............. H04W 4/42
(Continued)

FOREIGN PATENT DOCUMENTS

EP 2343105 A2 7/2011
EP 2343105 A3 10/2011

OTHER PUBLICATIONS

Extended European Search Report for corresponding European Application No. 22202526.4, dated Mar. 23, 2023.
(Continued)

*Primary Examiner* — Henry Tsai
*Assistant Examiner* — Christopher A Daley
(74) *Attorney, Agent, or Firm* — Finnegan, Henderson, Farabow, Garrett & Dunner, LLP

(57) ABSTRACT

A device bus node associated with an aircraft device has a plurality of communication ports for connecting with a respective bus of an electronic or optoelectronic bus system of a distributed system of an aircraft. The device bus node is configured to receive bus messages from at least one controller bus node of a controller sub-system of the distributed system and perform a self-configuration procedure after that each of its communication ports was connected with a respective different one of the busses of the electronic or optoelectronic bus system, for being fully operational in the distributed system, wherein the self-configuration procedure determines, based on bus messages received at its communication ports, at least part of individual configuration data being associated to the device bus node as part of the distributed system and being needed by the device bus node to enable a processing of a respectively received bus message.

17 Claims, 11 Drawing Sheets

(56) References Cited

U.S. PATENT DOCUMENTS

| | | | | |
|---|---|---|---|---|
| 11,632,308 | B2 * | 4/2023 | Dawes | G06F 3/0488 715/736 |
| 11,778,029 | B2 * | 10/2023 | Skaaksrud | G08B 23/00 340/521 |
| 11,792,330 | B2 * | 10/2023 | Baum | H04M 11/04 709/226 |
| 11,861,948 | B2 * | 1/2024 | Foland | B60L 58/12 |
| 12,006,035 | B1 | 6/2024 | De Paiva et al. | |
| 12,142,781 | B2 * | 11/2024 | Wiegman | B60L 58/21 |
| 2006/0206246 | A1 * | 9/2006 | Walker | H04L 63/302 701/16 |
| 2016/0308651 | A1 * | 10/2016 | Pollmann | H04L 12/40189 |
| 2022/0269291 | A1 * | 8/2022 | Teles Ferreira | B64C 13/503 |

OTHER PUBLICATIONS

International search report in connection to application No. PCT/EP2023/079007, dated Jan. 15, 2024.

* cited by examiner

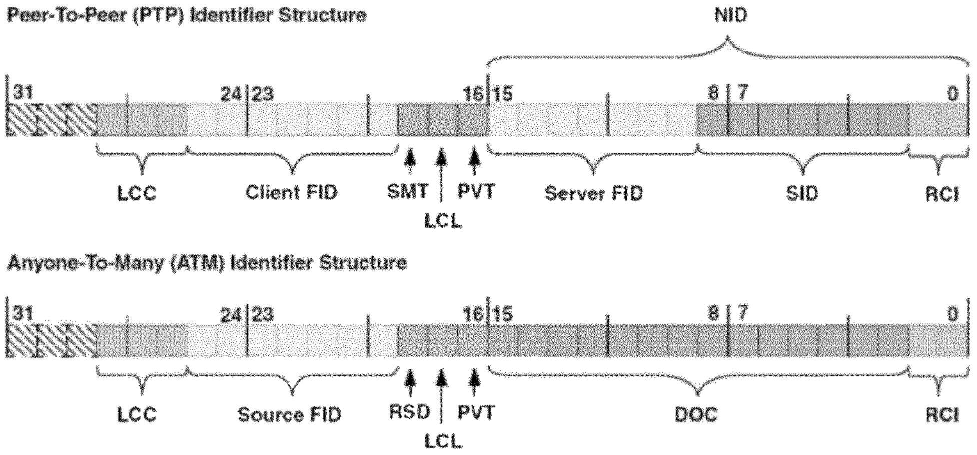

| Field | Description |
|---|---|
| LCC | Logical Communication Channel |
| FID | Aircraft Function ID |
| RSD | Reserved |
| SMT | Service Message Type |
| LCL | Local Bus Only |

| Field | Description |
|---|---|
| PVT | Private Data |
| SID | Server ID |
| RCI | Redundancy Channel ID |
| NID | Node ID |
| DOC | Data Object Code |

Fig. 4

| Channel Number | Channel Acronym | Communication Type | Description | LCC Bits | Message Priority |
|---|---|---|---|---|---|
| 0 | EEC | ATM | Exception Event Channel | 000 | Highest |
| 1 | | | Reserved | 001 | |
| 2 | NOC | ATM | Normal Operation Channel | 010 | |
| 3 | | | Reserved | 011 | |
| 4 | NSC | PTP | Node Service Channel | 100 | |
| 5 | UDC | ATM/PTP | User-defined Channel | 101 | |
| 6 | TMC | PTP | Test and Maintenance Channel | 110 | |
| 7 | FMC | ATM/PTP | CAN Base Frame Migration Channel | 111 | Lowest |

Fig. 5

SELF-CONFIGURATION OF BUS NODES IN A BUS SYSTEM OF AN AIRCRAFT

CROSS REFERENCE TO RELATED APPLICATIONS

This application is a United States patent application claiming priority to European Patent Application No. 22202526.4 filed on Oct. 19, 2022.

TECHNICAL FIELD

The present invention generally relates to a distributed system for an aircraft that has an electronic or optoelectronic bus system, for example a CAN bus system, and to an aircraft that has such a distributed system. A prominent example for such a distributed system is a flight control system. An aircraft of particular interest is an aircraft of the canard type having multiple lift/thrust units distributed along the front or canard wings and along the aft or main wings. Preferably, these lift/thrust units are electrically powered. However, the invention may also be applied to completely different types of aircraft.

The invention further relates to a bus node that is configured for being integrated in such a distributed system, possibly a flight control system, a method for configuring such a bus node and a method for mounting an aircraft device at a respective location of the aircraft, for example at or in wing or at or in a fuselage of an aircraft, and integrating the aircraft device into the distributed system or flight control system of the aircraft.

BACKGROUND

Aircrafts may be generally classified into fixed wing and rotating wing types. Fixed wing aircrafts typically include a plurality of flight control surfaces that, when controllably positioned, guide the movement of the aircraft from one destination to another destination. The number and type of flight control surfaces included in an aircraft may vary. Primary flight control surfaces are typically those that are used for controlling the aircraft movement with respect to the pitch, yaw and roll axes. Secondary flight control surfaces are typically those that are used to influence the lift or drag (or both) of the aircraft. Typical primary flight control surfaces include elevators, ailerons and rudder, and typical secondary flight control surfaces include a plurality of flaps, slats, speed brakes and spoilers.

Rotary-wing aircraft, such as e.g. helicopters, typically do not have flight control surfaces that are separated from the airfoils that produce lift, but the airfoils that constitute the rotating wing have a cyclic control for pitch and roll, and a collective control for lift.

Further, aircrafts are known, which have a vertical take-off and landing capability based on propulsion engines, which are mounted rotatably with respect to a transvers axis or pitch axis of the aircraft. The propulsion engines are controllably movable between a cruising flight position and a take-off/landing position. In the cruising position the engines provide forward thrust and the movement of the aircraft through the air is controlled by means of suitable flight control surfaces. In the take-off/landing position, the propulsion engines are angled downwards for allowing a vertical take-off or landing based on the thrust provided by the engines.

Such types of aircraft with vertical take-off and landing capability and having electrically driven ducted propellers as propulsion engines have been proposed by the present applicant Lilium eAircraft GmbH according to the publications US 2016/0023754 A1 and US 2016/0311522 A1 and further publications of the same patent families. The present applicant meanwhile has developed an aircraft denoted as Lilium jet, which is a canard type aircraft and has plural left front engines, plural right front engines, plural left aft engines and plural right aft engines in the form of ducted propellers operated electrically, which are mounted to respective flaps of the front left and right canard wing and the left and right aft or main wing of the canard type aircraft. The first test flight of this Lilium jet was performed on Oct. 1, 2019.

For any such kind of aircrafts and any other type of aircraft, resilience against technical failures is one of the most important aspects. The flight control system is a critical system, for which redundancy must be provided, also in view of regulatory requirements, which have to be met. The present applicant proposed a fault tolerant flight control system having a redundant CAN bus system to achieve a very high resiliency against technical failures, as is disclosed in EP 3 998 200 A1. The complete disclosure of this publication is included into the present disclosure by reference.

An aircraft typically has several units of the same equipment or type (for example, thirty-six propulsion units or lift/trust units in case of the Canard type aircraft disclosed in EP 3 998 200 A1, each having the same part number). For being properly integrated into the flight control system of the aircraft, each of these units (more precisely, the respective bus node (or device bus node) of each of these units) needs an individual configuration depending on the place where the respective unit is installed or depending on the function or functions, the respective unit shall perform. One may put it in this way: Each unit has to know in which place or at which location in the aircraft it is installed or/and which function or functions it shall perform. This information or other alternate individual configuration information may be needed for several different reasons, for example for configuring the type or position of a respective actuator a bus node of each unit is controlling, for configuring its identity when communicating with other units, for configuring the type or position of sensors it is reading etc.

In the propulsion unit case, for example, such an individual configuration of each unit may provide that the respective unit "knows" the position where it is installed in the wing or the canard, so that the respective unit is enabled to respond appropriately to commands related to that position being sent by the flight control computer system via the bus system. For example, the flight control system may issue different commands to the left and right units of the aircraft to generate a rolling moment.

There are a number of conventional approaches that work well in principle but have disadvantages. For example, each unit is pre-programmed (e.g. through a maintenance activity) with the location or function or other individual configuration parameter as a parameter data item before being installed. According to another conventional approach, each unit is provided with an external device holding the configuration parameters like the location where the unit is installed. Such an external device is known as a so-called "personality module". A further well-known conventional option is to manufacture the units with some electrical contacts (like pins or jumpers) that can be used to define its location or/and at least other individual configuration parameter, by connecting some of these pins, for example, to ground. This can be made either internally to the units or through changes on the harness connected to the units. The latter is the most common solution used in practice.

A solution through configuration of the units through pre-programming or internal configuration pins (jumpers) does not add weight, but is inconvenient from the point of view of maintenance and assembly procedures. Each of the thirty-six propulsion units would have to be pre-programmed or individualized by setting configuration pins before installation (on the production line, for example). This increases maintenance and assembly time and therewith the cost.

A solution through an external device increases the size and weight of each unit and adds a failure mode, since the connection with the external device may fail.

A solution using configuration pins set on the harness increases the size of the connector between the propulsion unit and wing, at an extremely constrained space. The connector having an increased size will also have an increased weight. Similar disadvantages result for other kinds of units of the same type.

An aircraft typically may have several units of the same equipment or type also in other technical contexts than considered so far. For example, the power distribution system of certain aircrafts may use a plurality or even many of such units of the same equipment or type. Such units of another kind than propulsion units or lift/trust units may be battery management modules respectively associated to one particular battery of plural batteries or to one particular battery pack of plural battery packs of the aircraft or may be power switching or power circuit protection devices such as so-called Solid-State Power Controllers (SSPCs) over which the propulsion units or lift/trust units propulsion units or lift/trust units receive their electrical operating power.

In this respect it is referred to the disclosure of European patent application 21174719.9 having the title ELECTRICAL FAULT ISOLATION IN A POWER DISTRIBUTION NETWORK OF AN AIRCRAFT and published as EP 3 998 687 A1 and to the disclosure of European patent application 21174722.5 having the title TIME VARIABLE ELECTRICAL LOAD SHARING IN A POWER DISTRIBUTION NETWORK OF AN AIRCRAFT and published as EP 3 998 201 A1.

These units of another kind may be controllable by a dedicated controller or dedicated controller sub-system of the aircraft, i.e. not necessarily by the flight control computer system of the aircraft. One could connect these units of another kind with the dedicated controller or dedicated controller sub-system (or alternatively with the flight control computer system, if desired) by means of a CAN bus system or another kind of bus system. In principle, the same or analogous unfavorable conventional configuration tasks would have to be performed or the same unfavorable conventional configuration solutions would have to be applied, as considered in the foregoing. The same may be true for other kinds of distributed systems of an aircraft as well.

Depending on the speed and bandwidth requirements of the respective units of another kind, various kinds of conventional bus systems may be used in this context, such as EIA-/RS-485 and so forth.

In view of the foregoing, it is an object of the present invention to provide solutions that avoid such disadvantages.

Further, it is an object of the present invention to provide favorable other solutions, in particular for an aircraft flight control system.

In particular, it is an object of the present invention to enable a simple and cost effective individual configuration of the bus node (or device bus node) of each respective unit (or aircraft device) being integrated or to be integrated in the distributed system of the aircraft, possibly (but not mandatory) an aircraft flight control system, as considered, while allowing to minimize the space requirements and the weight of the respective unit.

SUMMARY OF THE INVENTION

For achieving these objects, the invention, according to a first aspect, provides a distributed system for an aircraft, comprising a controller sub-system having at least one controller bus node that is connected via an electronic or optoelectronic bus system with a plurality of device bus nodes that are associated to or belong to aircraft devices of a common type of the distributed system. For example, the distributed system may be a flight control system for an aircraft. In this case, the controller sub-system may be represented or comprised by a flight control computer system having as controller bus node or controller bus nodes at least one flight control computer bus node.

Accordingly, the invention, according to the first aspect, provides according to a sub-aspect a flight control system for an aircraft, comprising a flight control computer system having at least one flight control computer bus node that is connected via an electronic or optoelectronic bus system with a plurality of device bus nodes that are associated to or belong to aircraft devices of a common type. According to a non-limiting example, the device bus nodes may be bus nodes of propulsion units or lift/thrust units. However, the device bus nodes may alternatively be bus nodes of other kinds of aircraft devices.

The controller bus node (or the flight control computer bus node) and the device bus nodes are configured to communicate via the electronic or optoelectronic bus system on basis of at least one predetermined bus communication protocol using bus messages having a pre-defined message format providing that an identifier or payload data of a respective bus message includes bus identity information. The identifier may additionally include further identity information that preferably identifies at least a respective bus node that has transmitted the respective bus message. The identifier may favorably include further information being addressed to bus nodes receiving the bus message as basis for a processing of the bus message by the respective bus node. This processing may involve a processing of payload data of the respective bus message. According to a non-limiting example, the bus system may be a CAN bus system, so that the bus messages are CAN bus messages, but other types of bus systems are not ruled out.

The electronic or optoelectronic bus system is a redundant electronic or optoelectronic bus system comprising plural independent busses, wherein each of the device bus nodes is connected to a respective associated bus group of plural independent busses of the redundant electronic or optoelectronic bus system.

According to the invention, the device bus nodes each comprise a controller device that is configured to derive a configuration of the device bus node in the distributed system based on the bus identity information of received bus messages and pre-defined bus allocation data.

For being connected with the busses of the associated bus group, the device bus node each may have plural communication ports, to which a respective of the independent busses may be connected.

The configuration of the device bus nodes may be defined by respective individual configuration data associated to the respective device bus node. The respective individual configuration data are derived (or determined) at least in part by the controller device based on the bus identity information and the pre-defined bus allocation data.

Accordingly, the device bus nodes may be configured to determine at least part of the respective individual configuration data being associated thereto based on an evaluation of the identifiers of bus messages received on at least two of their respective plural communication ports from the controller sub-system (e.g. realized by the flight control computer system). The determination of at least said part of the respective individual configuration data may additionally involve an evaluation of payload data of such received bus messages, but preferably an evaluation of the identifiers is sufficient to enable this determination.

This determination of at least part of the respective individual configuration data being associated to the respective device bus node corresponds to or enables the individual final configuration of the respective aircraft device, for example the configuration of the location of each propulsion unit (i.e. the configuring of each propulsion unit to the actual position in which it is installed in the aircraft).

Therewith the invention allows an automatic configuration of the propulsion units or aircraft devices of another kind without the need of configuration pins, a configuration device, or pre-programming before the installation in the aircraft. The propulsion units (or aircraft devices of another kind) can all be configured at the same time by a simple procedure being done when they are already installed in the aircraft. Maintenance involving replacement of a respective aircraft device by a new aircraft device is facilitated as well.

This can be achieved based on the way the propulsion units or aircraft devices of another kind are connected with the controller sub-system (e.g. the flight control computer system) via the redundant electronic or optoelectronic bus system. As mentioned, the bus nodes of the propulsion units or aircraft devices of another kind (i.e. the "device bus nodes" according to the terminology used here) may respectively have plural communication ports that may favorably be connected to a respective associated group of busses of the redundant electronic or optoelectronic bus system in an unique manner that differs between the device bus nodes. The definition "connected in a unique manner" refers to the busses the respective device bus node is connected at its communication ports and the association of these busses to the communication ports. For example, each propulsion unit or aircraft device of another kind has a unique combination of two CAN buses that it uses to communicate with the controller sub-system (e.g. the flight control computer system), even though there are several propulsion units (or aircraft devices of another kind) on a single CAN bus.

However, although not preferred, the use of simple configuration pins or the like set on the harness as additional basis for the automatic configuration of the propulsion units or aircraft devices of another kind shall not be ruled out completely. For example, an automatic self-configuration procedure performed by a respective propulsion unit could distinguish between the situation that the propulsion unit is mounted to a front or canard wing and the situation that the propulsion unit is mounted to an aft or main wing of a canard type aircraft based on the such a configuration pin and could then determine the mounting position at the respective wing by evaluating the identifiers and possibly payload data of bus messages received at the communication ports. Since the configuration pins wouldn't code for the mounting position at the respective wing, only a mirror weight and size increase would result from the configuration pins of the harnesses. This approach would allow controlling more propulsion units based on a given layout of the redundant electronic or optoelectronic bus system. To this end, pairs of device bus nodes could be connected to a respective associated group of busses of the redundant electronic or optoelectronic bus system in an unique manner that differs between the device bus nodes or corresponding pairs of device bus nodes.

According to preferred embodiment, the controller device is configured to derive the configuration of the respective device bus node in the distributed system based on a predefined allocation of busses of the electronic or optoelectronic bus system to the device bus nodes that is reflected in the bus allocation data.

Typically, the predefined allocation of the busses to the device bus nodes will depend on the installation positions of the aircraft devices being associated to the device bus nodes.

The predefined allocation of the busses may comprise a predefined allocation of the independent busses of the respective bus group to a particular of the communication ports of the respective device bus node.

As already implicitly considered, the controller device may favorably be configured to determine at least one supplementary differentiating feature that is related to the installation of the aircraft device being associated to the respective device bus node at a particular installation position of the aircraft, wherein the supplementary differentiating feature varies between at least two sub-sets of the aircraft devices being installed at their respective particular installation positions of the aircraft. The supplementary differentiating feature doesn't correspond to and cannot be derived from a/the predefined allocation of busses of the electronic or optoelectronic bus system to the respective device bus node that the device bus node may determine based on the bus identity information.

In particular, the controller device may be configured to identify a configuration contacting between a harness at a particular installation position of the aircraft and a connection portion of the respective device bus node or of the aircraft device being associated to the respective device bus node and being installed at this particular installation position, wherein the configuration contacting varies between at least two sub-sets of the aircraft devices being installed at their respective particular installation positions of the aircraft, to serve as a/the supplementary differentiating feature. The configuration contacting and therewith the supplementary differentiating feature doesn't correspond to and cannot be derived from a/the predefined allocation of busses of the electronic or optoelectronic bus system to the respective device bus node that the device bus node may determine based on the bus identity information.

Accordingly, the controller device may be configured to derive the configuration of the respective device bus node in the distributed system based on a/the predefined allocation of busses of the electronic or optoelectronic bus system to the device bus nodes and the predefined supplementary differentiating feature that are reflected in the bus allocation data.

Typically, the predefined allocation of the busses to the device bus nodes and the respective predefined differentiating feature will depend on the installation positions of the aircraft devices being associated to the device bus nodes.

Alternatively, the buses of the electronic or optoelectronic bus system may be allocated to the device bus nodes in a unique manner that differs between the device bus nodes, so that no supplementary differentiating feature is required for enabling the self-configuration. To this end, either a respective device bus node may be connected to a dedicated individual combination of plural independent busses or respective plural device bus nodes being connected to the same bus group may have their plural independent busses assigned differently to the plural bus communication ports of each of these device bus nodes.

Certain teachings considered in the foregoing can be worded differently. The device bus nodes may be connected at their communication ports to the respective associated group of busses of the redundant electronic or optoelectronic bus system in a characteristic manner that differs between groups of the device bus nodes or in a unique manner that differs between the device bus nodes.

Each of the device bus nodes may have associated a characteristic group of busses of the redundant electronic or optoelectronic bus system, that differs between groups of the device bus nodes, so that device bus nodes belonging to different groups respectively are connected at their communication ports with a different combination of busses of the electronic or optoelectronic bus system. At least one of a supplementary differentiating feature, possibly a configuration contacting, and an association of the busses of the characteristic group to the communication ports may vary between the device bus nodes belonging to the same group.

Alternatively, each of the device bus nodes may have associated a unique group of busses of the redundant electronic or optoelectronic bus system, that differs between the device bus nodes, so that the device bus node respectively are connected at their communication ports with a different combination of busses of the electronic or optoelectronic bus system.

For enabling the individual configuration of the device bus nodes, the controller sub-system (e.g. the flight control computer system) may send dedicated configuration bus messages over the busses of the redundant bus system. However, the individual configuration of the device bus nodes may also be achieved based on "normal" or regular bus messages to be used in the flight operation of the aircraft. By observing a code embedded in the messages that are sent by the controller sub-system (e.g. the flight control computer system), each propulsion unit or aircraft devise of another kind is able to identify the combination or combination and assignment of buses that it is using and, therefore, its location or another individual configuration parameter or parameter set. If such codes are not included in the normal or regular bus messages, however, dedicated configuration bus messages as mentioned are a valuable option to nevertheless enable the proposed self-configuration of the device bus nodes. The dedicated configuration bus messages may have included such codes in the identifier or in the message payload data. In this case, the identifier of a respective configuration bus message may indicate that the bus message is a dedicated configuration message to trigger an evaluation of the message payload data.

The device bus nodes may each have individual configuration data associated thereto that enable a processing of the identifier of a respective bus message by the respective device bus node. The device bus nodes each may be configured to at least one of a) processing, based on the respective individual configuration data and the identifier of the respective bus message, bus messages received via the electronic or optoelectronic bus system from the controller sub-system (e.g. realized by a flight control computer system) or another of the device bus nodes, b) sending bus messages via the electronic or optoelectronic bus system to at least one of the controller sub-system (e.g. realized by the flight control computer system) and one or plural of the device bus nodes, wherein the identifier of a respective sent bus message includes data being uniquely based on the respective individual configuration data.

The device bus nodes may be configured to determine at least part of the respective individual configuration data being associated thereto based on an evaluation of the bus identity information of bus messages received on at least two of their respective plural communication ports from the controller sub-system, as already considered.

Generally it is proposed that the controller sub-system (e.g. the flight control computer system) is configured to send bus messages selectively over the busses of the electronic or optoelectronic bus system, so that a respective bus message is transmitted only via one particular bus of the electronic or optoelectronic bus system. The identifier or payload data of each such bus message includes information, e.g. such as the mentioned code, that indicates the particular bus over which the respective bus message was transmitted. Based on this information, the device bus nodes are enabled to determine the combination of two buses (or at least two) that it uses to communicate with the controller sub-system (e.g. the flight control computer system). However, the combination of the busses the respective device bus node is connected with may alternatively be determined differently, e.g. by evaluating other information that indirectly reflects the bus over which a respective bus message was received.

Preferably, all regular bus messages are transmitted by the controller sub-system (e.g. the flight control computer system) selectively over the busses of the electronic or optoelectronic bus system, so that a respective bus message is transmitted only via one particular bus of the electronic or optoelectronic bus system. To advantage, the identifier of each such bus message may include information, e.g. such as the mentioned code, that indicates the particular bus over which the respective bus message was transmitted. Therewith a self-configuration of the device bus nodes of each propulsion unit or aircraft devise of another kind as already explained is enabled, without requiring that the controller sub-system (e.g. the flight control computer system) performs a dedicated configuration procedure.

Alternatively, the controller sub-system (e.g. the flight control computer system) may be configured to perform a dedicate configuration procedure that involves to transmit dedicated configuration bus messages selectively over the busses of the electronic or optoelectronic bus system, so that a respective configuration bus message is transmitted only via one particular bus of the electronic or optoelectronic bus system, wherein the identifier or the payload data of each such configuration bus message includes information, e.g. such as the mentioned code, that indicates the particular bus over which the respective configuration bus message was transmitted. This approach enables a self-configuration of the device bus nodes of each propulsion unit or aircraft devise of another kind as already explained as well, but requires a dedicated interaction between the controller sub-system (e.g. the flight control computer system) and the device bus node or device bus nodes to be configured.

Preferably, the controller sub-system (e.g. the flight control computer system) comprises plural controller bus nodes (e.g. plural flight control computer nodes) that use busses of different sub-sets of the busses of the bus system. The controller bus nodes (or the flight control computer bus nodes) favorably may be configured to include in bus messages transmitted over the electronic or optoelectronic bus system identity information that identify the respective controller bus node (e.g. flight control computer bus node) that has transmitted the respective bus message. This identity information may favorably be included in the identifiers of the bus messages, preferably combined with information that indicates the particular bus over which the respective bus message was transmitted.

The invention favorably enables a totally automated self-configuration of the device bus nodes that possibly involves an automatic location identification, based only on the combination of buses (or based on the combination of busses and assignment of the busses to the communication ports of the respective device bus node and possibly at least one supplementary differentiating feature), without any kind of physical configuration or manual activity before installing the unit in the aircraft.

Various technical and other advantages result. The main technical advantages of the invention pertain to weight and size reduction, both because the circuitry related to e.g. location identification (such as connector pins or jumper pins) is not needed. Further, due to the reduction on the number of components, there is an increase of reliability.

Economic advantages result as well. The invention has a positive economic impact essentially through the reduction of costs, either direct or in terms of time to execute activities. In case of propulsion units, costs are reduced in the following activities:

1 Assembly of each propulsion unit: Since configuration pins are not needed, there is a reduction in the printed circuit board space and the connector space needed. The counterpart is an additional software function, which is a non-recurrent cost.

2. Assembly of the propulsion units in the aircraft: Since no individual pre-programming is needed, assembly is faster and there is less documentation to be kept (for example, what is the location programmed in each of e.g. thirty-six propulsion units). In comparison to conventional pin programming through the harness, no different harness for each unit is required. The number of different parts that have to be managed in the production is substantially reduced.

3. During maintenance, the advantages are similar to the advantages during aircraft assembly: Simplified maintenance procedures and a smaller number of parts to be kept in inventory or to have the configuration tracked.

An important further advantage is that faults in the assembly of the propulsion units in the aircraft are avoided, since it is not possible to mount a propulsion unit at a wrong location. The propulsion units (or aircraft devices of another kind) can be mounted in an arbitrary manner at the various locations of the aircraft, since the individual configuration takes places after the mounting.

For achieving that the device bus nodes are connected to the respective associated group of busses of the redundant electronic or optoelectronic bus system in an unique manner that differs between the device bus nodes, the respective plural communication ports of the device bus nodes may be connected to a respective associated group of busses of the redundant electronic or optoelectronic bus system in such a manner that at least one of the group of busses a respective device bus node is connected with at its communication ports and of the allocation of the busses of a respective group of busses to the communication ports of a respective device bus node differs between the device bus nodes. Assuming that a respective device bus node has two communication ports (i.e. not more than two communication ports) as is the preferred realization, two of the device bus nodes could be connected with the same pair of busses, wherein a first device bus node is connected at its first communication port with the first bus and at its second communication port with a second bus, and the second device bus node is connected at its first communication port with the second bus and at its second communication port with the first bus. However, according to a preferred embodiment, no two or more device bus nodes are connected with the same group of busses.

A typical redundant flight control system will have a flight control computer system comprising plural flight control computer bus nodes. In this case, at least one control computer bus node may be configured to communicate via one or plural of said plural independent busses being associated thereto and at least one other control computer bus node may be configured to communicate via one or plural other of said plural independent busses being associated thereto.

According to a preferred embodiment, the electronic or optoelectronic bus system includes plural independent bus sub-systems each having one or plural busses, wherein each of the device bus nodes has at least two communication ports and is connected via its communication ports to at least two busses belonging to different of the plural independent bus sub-systems. Favorably, a first bus sub-system of said plural independent bus sub-systems may have plural busses and a second bus sub-system of said plural independent bus sub-systems may have plural busses. Each of the device bus nodes may be connected at a first of its communication ports with a selected bus of the first bus sub-system and may be connected at a second of its communication ports with a selected bus of the second bus subsystem. Each of the device bus nodes may have just two such communication ports, namely said first communication port and said second communication port. In case that the flight control computer system has plural flight control computer bus nodes, at least one of the flight control computer bus nodes may be configured to communicate via the first bus sub-system but not via the second bus subsystem and at least one of the flight control computer bus nodes may be configured to communicate via the second bus sub-system but not via the first bus subsystem.

Referring to the configuration data being individually associated to the device bus nodes, these respective individual configuration data may favorably enable the device bus nodes to determine in the processing based on the identifier of the respective bus message whether or in which manner the bus message is relevant for the respective device bus node. Further, the respective individual configuration data may enable the device bus nodes to interpret the payload data or a particular portion of the payload data of a respective bus message determined to be relevant, such that an action commanded by the bus message can be performed by the respective device bus node. Accordingly, the device bus nodes may be configured such that the processing of received bus messages involves determining, based on the respective individual configuration data and the identifier of a respective bus message, whether this bus message is relevant for the respective device bus node. Further, the device bus nodes may be configured such that the processing of received bus messages involves an interpretation of the payload data of a respective bus message based on the respective individual configuration data and the identifier of this bus message.

According to a preferred embodiment, the device bus nodes may be configured such that the processing of received bus messages involves a selection of particular payload data from the payload data of a respective bus message, wherein the device bus nodes are configured to select the particular payload data based on the respective individual configuration data and the identifier of the respective bus message.

The device bus nodes will generally be configured to at least one of i) controlling a respective aircraft device, to which the respective device bus node is associated or belongs, based on bus messages received via the bus system from the controller sub-system (e.g. the flight control computer system) and determined to be command bus messages relevant for the respective device bus node and ii) sending bus messages being information bus messages to the controller sub-system (e.g. the flight control computer system) via the bus system. The mentioned individual configuration data may enable the device bus nodes to send proper bus messages via the bus system.

For example, a respective device bus node may be configured to control a propulsion unit (or a set of plural propulsion units, e.g. two propulsion units) or a flap of the aircraft or a combination of at least one propulsion unit and an associated flap of the aircraft. A device bus node configured to control a propulsion unit and a flap may indeed be realized by two separate device bus nodes that may be identified conceptually as a kind of sub-nodes, but could be completely independent device bus nodes from a merely technical point of view.

Referring to said further information being included in the identifier of a respective bus message and being addressed to device bus nodes receiving the bus message as basis for the processing, this further information may be included in the identifier of a respective bus message in the form of specification data that may specify directly or indirectly at least one of

- a data type or data types of payload data of the respective bus message,
- a data format or data formats of payload data of the respective bus message,
- at least one bus node identity of a device bus node that is addressed by the respective bus message,
- a multicast address of plural device bus nodes addressed by the respective bus message,
- a unicast address of one device bus node addressed by the respective bus message,
- a flag indicating whether a specified address is a multicast address or a unicast address,
- a message ID, and
- at least one of a particular bus sub-system of plural bus sub-systems of the electronic or optoelectronic bus system and a particular bus of the particular sub-bus system or the electronic or optoelectronic bus system over which the respective bus message is transmitted.

More specific, the specification data of the identifier of a bus message may directly or indirectly specify at least one of

- a current or commanded flight state parameter, to which the payload data relate;
- a current or commanded flight control parameter, to which the payload data relate;
- an current or commanded engine parameter, to which the payload data relate;
- a current or commanded flap parameter, to which the payload data relate;
- a function of an aircraft device, to which the payload data relate;
- a type of an aircraft device, to which the payload data relate;
- a location at an aircraft fuselage or an aircraft wing of an aircraft device, to which the payload data relates; and
- an identity of an aircraft device, to which the payload data relate.

The respective individual configuration data that are individually associated to a respective of the device bus nodes may include complementary specification data that correspond to specification data of bus messages being relevant for the respective device bus node or that supplement the specification data of respective bus messages being relevant for the respective device bus node. In particular, the complementary specification data may include identification data that enable a respective device bus node to identify bus messages that are relevant for this device bus node.

In case of bus messages that are addressed to plural device bus nodes and that include individual payload data for each of these device bus nodes being addressed, the respective complementary specification data may enable access to the individual payload data being addressed to a particular of these device bus nodes. For example, the complementary specification data may define a particular respective bit range of a data word or data words of a bus message, wherein this bit range includes the individual payload data being addressed to this particular device bus node.

A plurality of device bus nodes of a common type may each be provided with common configuration data in a respective local memory of the device bus nodes. The local memory typically will be a non-volatile memory, but a volatile memory is not absolutely ruled out. The common configuration data may comprise for each of these device bus nodes a respective set of individual configuration data being associated thereto. The device bus nodes favorably may have associated further individual configuration data, including data that indicate which set of individual configuration data is associated to the respective device bus node. The device bus nodes may be configured to determine these further individual configuration data being associated thereto by evaluating respective identifiers and possibly respective payload data of bus messages received on said at least two of their respective plural communication ports from the controller sub-system (e.g. the flight control computer system). The common configuration data may be denoted as pre-configuration data of the device bus nodes and may comprise association data that allow to determine the further individual configuration data by evaluating the respective identifiers and possibly respective payload data. These further individual configuration data may comprise or correspond to the mentioned complementary specification data or may be comprised by the mentioned complementary specification data. In particular, these further individual configuration data may comprise or correspond to said data that indicate which set of individual configuration data is associated to the respective device bus node. Further, these further individual configuration data may comprise or correspond to said identification data that enable a respective device bus node to identify bus messages that are relevant for this device bus node.

The electronic or optoelectronic bus system may favorably be realized as a CAN bus system that comprises plural independent CAN busses. In this case, the predetermined bus communication protocol may be a CAN bus communication protocol. This CAN bus communication protocol may favorably correspond to or may be based on a known CAN bus standard, like CAN 2.0B, CAN with Flexible Data Rate (CAN FD), CANaerospace, ARINC 825 including the supplement ARINC 825-4 and the like. As is provided by such CAN bus standards, the predetermined bus communication protocol may provide for bus communications based on the "Anyone-to-Many" principle, according to which bus messages sent via the CAN bus system are received by all bus nodes being connected with a respective CAN bus that carries the respective bus message. However, as is provided by the ARINC 825 specification, the predetermined bus communication protocol may provide alternatively or additionally for bus communications based on the "Peer-to-Peer" principle or the "Server-Client" principle, according to which at least one of a respective bus node called to perform an action and a respective bus node function underlying the action to be performed is addressed in the identifier of a respective bus message. Plural of such bus nodes may be addressed by a respective bus message, e.g. by using multicast addresses in the identifier. If only one bus node shall be addressed by a respective bus message, unicast addresses may be used.

For achieving the advantages of the present invention in an effective manner, the device bus nodes may be configured to perform a self-configuration procedure based on pre-configuration data stored in a memory of the respective device bus node that involves per respective device bus node listening to bus messages received on at least two of plural communication ports (i.e. the plural communication ports of the respective device bus node);

evaluating the identifiers of said bus messages to identify bus messages that enable a self-configuration (i.e. a self-configuration of the respective device bus node);

for each of said at least two communication ports: extracting respective self-configuration raw data from at least one bus message received at the respective communication port and identified to enable the self-configuration;

determining the configuration of the respective device bus node based on the extracted self-configuration raw data and association data of the pre-configuration data.

To this end, at least a part of the respective individual configuration data already mentioned may be determined based on the extracted self-configuration raw data and the association data of the pre-configuration data. The association data may be identic or may correspond to the pre-defined bus allocation data or may by comprised by the pre-defined bus allocation data.

As already mentioned, one may provide that all bus messages being sent by the at least one controller bus node via the busses of the electronic or optoelectronic bus system are suitable for enabling the self-configuration. However, other entities may send bus messages over the busses as well that may include no information enabling a correct self-configuration. Therefor the evaluating step of the self-configuration procedure will at least have to verify that the bus message originates from an entity, typically one of the controller bus nodes, that is pre-defined as an entity that transmits messages on which the self-configuration may be based. This evaluating step is even more necessary, if the at least one controller bus node would send dedicated configuration bus messages that enable the self-configuration, so that other messages from the least one controller bus node would not be suitable as basis for the self-configuration.

The self-configuration procedure may involve extracting the self-configuration raw data from at least one of the identifier and payload data of the respective bus message. Generally it is preferred, that the self-configuration raw data can be extracted from the identifier, so that the payload data might be irrelevant in this context.

According to a preferred solution, the self-configuration raw data may correspond to or may comprise bus allocation data that identify a particular associated bus of the electronic or optoelectronic bus system the respective communication port is connected with. In this case, the self-configuration procedure may further involve determining at least said part of the respective individual configuration data based on the bus allocation data obtained for said at least two communication ports and said association data of the pre-configuration data.

The device bus nodes may favorably be configured to store at least said part of the respective individual configuration data in a memory of the respective device bus node after having performed the self-configuration procedure, so that the individual configuration data associated to a respective device bus node are available for further operations of the bus node. Therefor the memory typically will be a nonvolatile memory, but a volatile memory is not absolutely ruled out.

The present invention, according to a second aspect, further provides a device bus node that is configured or configurable for being integrated in a distributed system, possibly (but not mandatory) a flight control system, according to the first aspect of the present invention as one of the device bus nodes.

According to a first approach under the second aspect, the invention provides a device bus node that has a plurality of communication ports for being connected with a respective bus of an associated bus group of plural independent busses belonging to an electronic or optoelectronic bus system of a distributed system, possibly (but not mandatory) a flight control system, of an aircraft, wherein the device bus node is configured to receive via its communication ports and the busses connected therewith bus messages from at least one controller bus node (e.g. at least one flight control computer bus node) of the distributed system and wherein a controller device of the device bus node is configured to perform a self-configuration procedure after that each of its communication ports was connected with a respective different bus of the associated bus group, for being fully operational in the distributed system, wherein the self-configuration procedure determines, based on bus identity information included in bus messages received at the communication ports and predefined bus allocation data, a configuration of the device bus node in the distributed system.

The controller device may be configured to derive the configuration of the device bus node in the distributed system based on an allocation of busses of the electronic or optoelectronic bus system to the device bus node that is reflected in the bus allocation data and is determined by the device bus node based on the bus identity information.

The controller device may further be configured to determine at least one supplementary differentiating feature that is related to the installation of the aircraft device being associated to the respective device bus node at a particular installation position of the aircraft. The supplementary differentiating feature doesn't correspond to and cannot be derived from a/the predefined allocation of busses of the electronic or optoelectronic bus system to the respective device bus node that the device bus node may determine based on the bus identity information. In particular, the supplementary differentiating feature doesn't correspond to and cannot be derived from the bus allocation data.

For example, the controller device may be configured to identify a configuration contacting that is related to the installation of the aircraft device being associated to the respective device bus node at a particular installation position of the aircraft. The configuration contacting that may serve as supplementary differentiating feature doesn't correspond to and cannot be derived from a/the predefined allocation of busses of the electronic or optoelectronic bus system to the respective device bus node that the device bus node may determine based on the bus identity information. In particular, the configuration contacting doesn't correspond to and cannot be derived from the bus allocation data.

The controller device may further be configured to derive the configuration of the respective device bus node in the distributed system based on the allocation of busses of the electronic or optoelectronic bus system to the device bus node and the supplementary differentiating feature or configuration contacting that are reflected in the bus allocation data and are determined by the controller device.

According to a second approach under the second aspect, that may be combined with the first approach, the invention provides a device bus node that is configured to perform a self-configuration procedure based on pre-configuration data stored in a memory (preferably a non-volatile memory) of the device bus node, wherein the self-configuration procedure involves

- listening to bus messages received on at least two of plural communication ports of the device bus node;
- evaluating identifiers of said bus messages to identify bus messages that enable a self-configuration of the device bus node;
- for each of said at least two communication ports: extracting respective self-configuration raw data from at least one bus message received at the respective communication port and identified to enable the self-configuration;
- determining the configuration of the device bus node based on the extracted self-configuration raw data and association data of the pre-configuration data.

To this end, at least a part of individual configuration data that define the configuration of the device bus node may be determined based on the extracted self-configuration raw data and association data of the pre-configuration data. The association data may be identic or may correspond to the pre-defined bus allocation data or may by comprised by the pre-defined bus allocation data.

As already mentioned, one may provide that all bus messages being sent by at least one controller bus node of the distributed system via the busses of the electronic or optoelectronic bus system are suitable for enabling the self-configuration. However, other entities may send bus messages over the busses as well that may include no information enabling a correct self-configuration. Therefor the evaluating step of the self-configuration procedure will at least have to verify that the bus message originates from an entity, typically one of the controller bus nodes, that is pre-defined as an entity that transmits messages on which the self-configuration may be based. This evaluating step is even more necessary, if the at least one controller bus node would send dedicated configuration bus messages that enable the self-configuration, so that other messages from the least one controller bus node would not be suitable as basis for the self-configuration.

The self-configuration procedure may involve extracting the self-configuration raw data from at least one of the identifier and payload data of the respective bus message. Generally it is preferred, that the self-configuration raw data can be extracted from the identifier, so that the payload data might be irrelevant in this context.

According to a preferred solution, the self-configuration raw data may correspond to or may comprise bus allocation data that identify a particular associated bus of the electronic or optoelectronic bus system the respective communication port is connected with. In this case, the self-configuration procedure may further involve determining at least said part of the respective individual configuration data based on the bus allocation data obtained for said at least two communication ports and said association data of the pre-configuration data.

The self-configuration procedure may further involve determining at least one supplementary differentiating feature and may involve determining at least said part of respective individual configuration data based on the bus allocation data, said association data and said at least one supplementary differentiating feature. The supplementary differentiating feature, possibly a configuration contacting, doesn't correspond to and cannot be derived from a/the predefined allocation of busses of the electronic or optoelectronic bus system to the respective device bus node that the device bus node may determine based on the bus identity information. In particular, the supplementary differentiating feature or configuration contacting doesn't correspond to and cannot be derived from the bus allocation data of the extracted self-configuration raw data.

The device bus node may favorably be configured to store at least said part of the individual configuration data in the memory after having performed the self-configuration raw data.

In this respect, it is proposed further that the individual configuration data comprise first configuration data already included in the pre-configuration data and second configuration data determined or to be determined by performing the self-configuration procedure.

According to a third aspect, the invention further provides an aircraft device for an aircraft. The aircraft device has a device bus node according to the second aspect of the invention, in particular for enabling integration of the aircraft device into an aircraft having a distributed system, possibly (but not mandatory) a flight control system, according to the first aspect of the invention.

According to a fourth aspect, the present invention further provides a method for configuring a device bus node associated to or belonging to an aircraft device, wherein the device bus node has a plurality of communication ports for being connected with a respective bus of an associated bus group of plural independent busses belonging to an electronic or optoelectronic bus system of a distributed system, possibly (but not mandatory) a flight control system, of an aircraft, wherein the device bus node is configured to receive via its communication ports and the busses connected therewith bus messages from at least one controller bus node (e.g. at least one flight control computer bus node) of the distributed system. The method includes to perform a self-configuration procedure by a controller device of the bus node after that each of the communication ports was connected with a respective different one of the busses of the electronic or optoelectronic bus system, for being fully operational in the distributed system. The self-configuration procedure determines, based on bus identity information included in bus messages received at the communication ports and pre-defined bus allocation data, a configuration of the device bus node in the distributed system.

It is further proposed that the self-configuration procedure provides that the following steps are performed:

- listening to bus messages received on at least two of its plural communication ports of the device bus node;
- evaluating identifiers of said bus messages to identify bus messages that enable a self-configuration of the device bus node;

for each of said at least two communication ports: extracting respective self-configuration raw data from at least one bus message received at the respective communication port and identified to enable the self-configuration;

determining the configuration of the device bus node based on the extracted self-configuration raw data and association data of the pre-configuration data being already available; and storing at least a part of the respective individual configuration data that define the configuration of the device bus node in the memory of the device bus node.

The association data may be identic or may correspond to the pre-defined bus allocation data or may by comprised by the pre-defined bus allocation data.

As already mentioned, one may provide that all bus messages being sent by at least one controller bus node of the distributed system via the busses of the electronic or optoelectronic bus system are suitable for enabling the self-configuration. However, other entities may send bus messages over the busses as well that may include no information enabling a correct self-configuration. Therefor the evaluating step of the self-configuration step will at least have to verify that the bus message originates from an entity, typically one of the controller bus nodes, that is predefined as an entity that transmits messages on which the self-configuration may be based. This evaluating step is even more necessary, if the at least one controller bus node would send dedicated configuration bus messages that enable the self-configuration, so that other messages from the least one controller bus node would not be suitable as basis for the self-configuration.

The self-configuration procedure may provide that at least one supplementary differentiating feature is determined and that said part of the respective individual configuration data is determined based on the extracted self-configuration raw data, said association data and said at least one supplementary differentiating feature. The supplementary differentiating feature, possibly a configuration contacting, doesn't correspond to and cannot be derived from a/the predefined allocation of busses of the electronic or optoelectronic bus system to the respective device bus node that the device bus node may determine based on the bus identity information. In particular, the supplementary differentiating feature or configuration contacting doesn't correspond to and cannot be derived from the self-configuration raw data, in particular bus allocation data thereof.

Preferably at least bus allocation data are extracted as said self-configuration raw data that identify a particular associated bus of the electronic or optoelectronic bus system the respective communication port is connected with.

The individual configuration data may comprise first configuration data already included in the pre-configuration data and second configuration data that are determined by performing the self-configuration procedure and are stored in the memory of the device bus node.

According to a fifth aspect, the present invention further provides a method of mounting an aircraft device at a location of an aircraft, for example in or at a wing or in or at a fuselage of the aircraft, and of integrating the aircraft device into a distributed system, possibly (but not mandatory) a flight control system, of the aircraft. The method involves that an arbitrary of plural aircraft devices of a common type is selected and mounted at the location where such an aircraft device is required and wherein said integrating into the distributed system involves to connect a device bus node of the aircraft device at at least two communication ports of the device bus node with at least two different busses of an electronic or optoelectronic bus system of the distributed system and to configure the device bus node by the method according to the fourth aspect of the present invention.

According to an independent sixth aspect, the invention provides a flight control system for an aircraft, comprising: a flight control computer system that is connected via an electronic or optoelectronic bus system with a plurality of device bus nodes, which each are configured to at least one of controlling an associated aircraft device based on command messages received from the flight control computer system via the bus system and sending information messages to the flight control computer system via the bus system; wherein the electronic or optoelectronic bus system is a redundant electronic or optoelectronic bus system having plural busses; wherein each device bus node has plural communication ports being connected to a respective associated group of busses of the redundant electronic or optoelectronic bus system.

To advantage, the device bus nodes may be connected at their communication ports to the respective associated group of busses of the redundant electronic or optoelectronic bus system in a unique manner that differs between the device bus nodes. Alternatively, the device bus nodes may be connected at their communication ports to the respective associated group of busses of the redundant electronic or optoelectronic bus system in a characteristic manner that differs between groups of the device bus nodes. The definitions "connected in a unique manner" and "connected in a characteristic manner" refer to the busses the respective device bus node is connected at its communication ports and the association of these busses to the communication ports of the respective device bus node.

Each of the device bus nodes may have associated a characteristic group of busses of the redundant electronic or optoelectronic bus system, that differs between groups of the device bus nodes, so that device bus nodes belonging to different groups respectively are connected at their communication ports with a different combination of busses of the electronic or optoelectronic bus system. In this case, at least one supplementary differentiating feature, possibly a configuration contacting, and an association of the busses of the characteristic group to the communication ports may vary between the device bus nodes belonging to the same group.

Alternatively, each of the device bus nodes may have associated a unique group of busses of the redundant electronic or optoelectronic bus system, that differs between the device bus nodes, so that the device bus nodes respectively are connected at their communication ports with a different combination of busses of electronic or optoelectronic bus system.

These proposals allow, for example, the favorable self-configuration of device bus nodes presented and discussed in the foregoing. In particular, the flight control system of the sixth aspect may be a distributed system according to the first aspect of the invention.

To this end, but also independently therefrom, the flight control computer system and the device bus nodes may favorably configured to communicate with each other using at least one predetermined bus communication protocol that provides at least for bus messages sent by the flight control computer system that an identifier of the respective bus message specifies an identity of a particular bus of the electronic or optoelectronic bus system over which the respective bus message is transmitted.

The flight control computer system may have plural flight control computer nodes and the flight control computer nodes and the device bus nodes may be configured to communicate with each other using at least one predetermined bus communication protocol that provides for bus messages sent by a respective of the flight control computer nodes that an identifier of the respective bus message specifies an identity of the flight control computer node that has sent this bus message.

The electronic or optoelectronic bus system may be a CAN bus system, so that the device bus nodes may be CAN bus nodes. To advantage, the flight control computer system and the device bus nodes may be configured to communicate with each other using at least one predetermined CAN bus communication protocol that provides for multicast addressing of plural of the device bus nodes as well as for unicast addressing of one particular device bus node. Therewith, very efficient CAN bus messaging can be achieved.

In this respect, it is proposed further that the predetermined CAN bus communication protocol provides for multicast and unicast addressing of CAN bus messages using an anyone-to-many, ATM, identifier structure of the CAN bus messages, wherein a data object code, DOC, field of the identifier codes for the kind of addressing and the multicast address or unicast address.

According to a preferred embodiment, the predetermined CAN bus communication protocol allows in case of multicast addressing of CAN bus messages that payload data of the CAN bus messages include different payload data items for the plural device bus nodes being addressed by the respective CAN bus message, wherein the device bus nodes are configured to access the respective at least one payload data item to be processed by the respective device bus node based on a message ID included in the DOC field.

Preferably, the flight control computer system is configured to send bus messages to the device bus nodes redundantly via the electronic or optoelectronic bus system, such that each device bus node receives the bus messages on at least two of its plural communication ports.

In this respect, it is proposed further that the flight control computer is configured to send bus messages to the device bus nodes selectively via the electronic or optoelectronic bus system, so that bus messages including commands for at least one particular device bus node are only sent via those busses to which the at least one particular device bus node is connected with at its plural communication ports.

This reduces the bandwidth requirements for the bus system and allows very efficient bus communications. Preferably, the flight control computer is configured such that bus messages including commands for plural device bus nodes are only sent via those busses of the electronic or optoelectronic bus system to which these plural device bus nodes are connected at a respective of their respective plural communication ports. Preferably, the control computer system may be configured such that the bus messages including commands for one particular device bus node or for plural particular device bus nodes are only sent via two busses of the electronic or optoelectronic bus system. Each of the device bus nodes preferably has only two communication ports to which a respective bus of the electronic or optoelectronic bus system is connected.

To advantage, each device bus nodes may be configured to communicate with the flight control computer system via its communication ports based on different predetermined bus communication protocols that differ between the communication ports.

Favorably, the electronic or optoelectronic bus system may comprise plural independent bus sub-systems, wherein each device bus node is connected at a first of its communication ports with an associated bus of a first bus subsystem and is connected at a second of its communication ports with an associated bus of a second bus sub-system. In this respect, it is proposed further that each device bus node is configured to communicate with the flight control computer system via the bus being associated to its first communication port on basis of a first predetermined bus communication protocol and wherein each device bus node is configured to communicate with the flight control computer system via the bus being associated to its second communication port on basis of a second predetermined bus communication protocol, that differs from the first predetermined bus communication protocol.

BRIEF DESCRIPTION OF THE DRAWINGS

The present invention with its aspects is further illustrated and explained on basis of non-limiting example embodiments with reference to the following figures:

FIG. 4 shows the ARINC 825 CAN identifier structures of CAN messages for "Peer-to-Peer" (PTP) communications and for "Anyone-to-Many" (ATM) communications over a CAN bus system.

FIG. 5 shows the usual logical communication channel assignment of ARINC 825.

The diagrams and tables of FIGS. 4 and 5 were published in various internet publications and are taken from http://de.wikipedia.org/wiki/ARINC_825.

Figure 1:
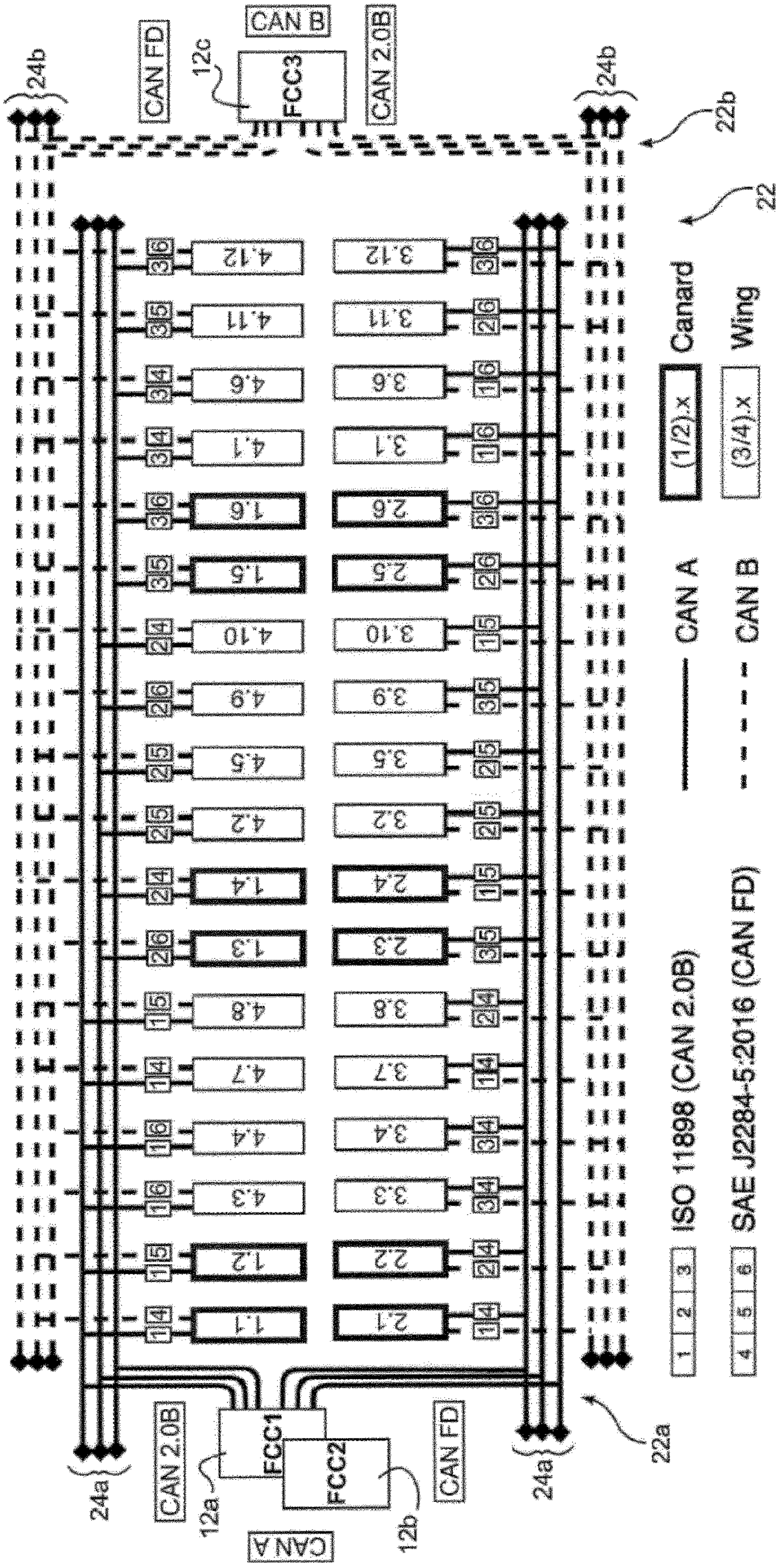
FIG. 1 shows an example of a favorable fault tolerant flight control system of a canard type aircraft and corresponds to FIG. 8 of EP 3 998 200 A1.
Figure 2:
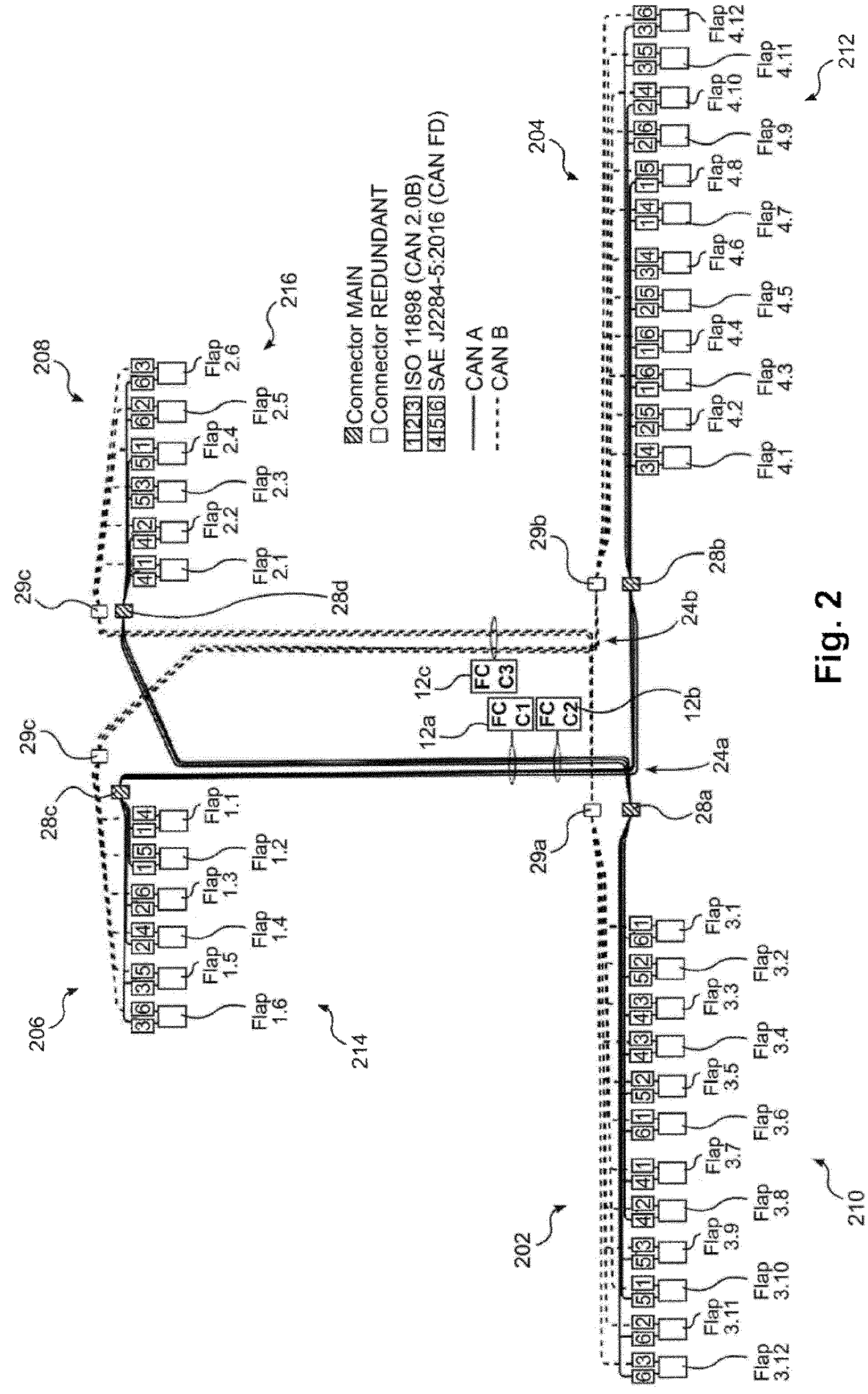
FIG. 2 shows the implementation of the flight control system according to FIG. 1 in a different manner, to show also the positional relation between various lift/thrust units with respect to each other and along the respective main wing or canard wing of the aircraft, and corresponds to FIG. 9 of EP 3 998 200 A1.

FIGS. 1 and 2 show a fault tolerant aircraft flight control system as is described in detail in EP 3 998 200 A1. The flight control system allows a redundant control of various lift/thrust units or propulsion units with a respective flap of the canard type aircraft by means of a redundant CAN bus system (22) having two independent CAN bus sub-systems (22*a*, 22*b*) being denoted as CAN A and CAN B.

The CAN bus nodes (or device bus nodes) of the various lift/thrust units each have two CAN bus communication ports and are redundantly connected at their two CAN bus communication ports with three redundant flight control computers FCC1, FCC2 and FCC3 via the two independent CAN bus sub-systems CAN A (22*a*) and CAN B (22*b*), which each have plural independent CAN busses (24*a*; 24*b*), namely six independent CAN busses per CAN bus sub-system according to the shown embodiment. The respective six independent CAN busses of CAN A and CAN B are numbered as CAN busses 1 to 6, and these numbers are indicated at the respective communication port of the respective CAN bus node in FIG. 2.

The configuration is such, that each CAN bus node is connected via a respective first CAN bus (24*a*1; 24*a*2; 24*a*3) of the first CAN bus sub-system CAN A (22*a*) with a first flight control computer FCC1 (12*a*) and a second flight control computer FCC2 (12*b*) and via a respective second CAN bus (24*b*1; 24*b*2; 24*b*3) of the second CAN-bus sub-system CAN B (24*b*) with a third flight control computer FCC3 (12*c*).

Each CAN bus node communicates over one of the respective two CAN busses according to a first CAN bus protocol and via the other of the respective two CAN busses according to a second CAN bus protocol. It is referred to ISO 11898 (CAN 2.0B) and SAE J2284-5:2016 (CAN FD) as the two CAN bus protocols that could be used.

A first group of the CAN bus nodes associated or belonging to the lift/thrust units may communicate via their respective first CAN bus (24*a*1; 24*a*2; 24*a*3) using the first CAN bus protocol and via their respective second CAN bus (24*b*1; 24*b*2; 24*b*3) using the second CAN bus protocol. A second group of the CAN bus nodes associated or belonging to the lift/thrust units may communicate via their respective first CAN bus (24*a*1; 24*a*2; 24*a*3) using the second CAN bus protocol and via their respective second CAN bus (24*b*1; 24*b*2; 24*b*3) using the first CAN bus protocol.

According to the assignment shown in FIGS. 1 and 2, the CAN bus nodes communicate over busses 1 to 3 of CAN A and CAN B according to ISO 11898 (CAN 2.0B) and communicate over busses 4 to 6 of CAN A and CAN B according to SAE J2284-5:2016 (CAN FD). Other assignment are possible. For example, the CAN bus nodes could communicate over all busses of CAN A according to ISO 11898 (CAN 2.0B) and could communicate over all busses of CAN B according to SAE J2284-5:2016 (CAN FD).

For further details of the flight control system of FIGS. 1 and 2 and its redundant CAN bus system, it is referred to EP 3 998 200 A1. The complete disclosure of this publication is included into the present disclosure by reference. The references signs shown in FIGS. 1 and 2 and mentioned in the foregoing are those that are used in the figure set and the specification of EP 3 998 200 A1.

According to the shown prior art flight control system, a respective pair of busses including one bus of CAN A and one CAN bus of CAN B may be connected with two of the CAN bus nodes. For example, with reference to FIGS. 1 and 2, the CAN bus nodes 3.12. and 2.6 both are connected with the CAN bus no. 6 of the first CAN bus sub-system CAN A (22*a*) and CAN bus no. 3 of the second CAN-bus sub-system CAN B (24*b*). As can be seen more easily in FIG. 2, CAN bus node 2.6 is connected at its left (first) CAN bus communication port with CAN bus no. 6 of CAN A and at its right (second) CAN bus communication port with CAN bus no. 3 of CAN B, and CAN bus node 3.12 is connected at its left (first) CAN bus communication port with CAN bus no. 6 of CAN A and at its right (second) CAN bus communication port with CAN bus no. 3 of CAN B as well. This means, that the two CAN bus nodes 2.6 and 3.12 are connected with the redundant CAN bus system made up from CAN A and CAN B in the same manner not differing between the two bus nodes, but differing from the manner the other device bus nodes are connected with the redundant CAN bus system. Analogously, the pairs of CAN bus nodes 2.5 and 3.11; 2.4 and 3.10; 2.3 and 3.9, 2.2 and 3.8; 2.1 and 3.7; 1.6 and 4.12; 1.5 and 4.11; 1.4 and 4.10; 1.3 and 4.9; 1.2 and 4.8; 1.1 and 4.7 respectively are connected with a respective common pair of CAN busses, namely one CAN bus of CAN A and one CAN bus of CAN B.

However, the CAN bus nodes 3.6, 3.5, 3.4, 3.3, 3.2, 3.1 and 4.6, 4.5, 4.4, 4.3, 4.2 and 4.1 each are connected in an unique manner with the redundant CAN bus system that differs between these bus nodes and differs also from all device bus nodes already mentioned.

As can be seen in FIG. 2, the CAN bus nodes 3.6, 3.5, 3.4, 3.3, 3.2, 3.1 and 4.6, 4.5, 4.4, 4.3, 4.2 and 4.1 belong to lift/thrust units that are located at the inner six lift/thrust unit mounting positions of the left and right main wing of the canard type aircraft. Accordingly, the combination of the two respective CAN busses each CAN bus node is connected with, indicates clearly and unambiguously the respective main wing and the mounting position at the respective main wing each of these CAN bus nodes is installed. Using CAN bus messages that indicate directly or indirectly the CAN bus over which the respective bus message is transmitted, a self-configuration of a respective CAN bus node after mounting and complete installation at one of these mounting positions is enabled, to determine the respective main wing and the mounting position at the respective main wing, based on the unique pair of CAN busses the bus node was connected with in the installation. This is a non-limiting example for an automatic location identification and corresponding self-configuration of plural propulsion units (lift/thrust units) in a distributed propulsion system For the other CAN bus nodes that are connected pairwise with a respective pair of CAN busses, it is to be noted that each pair of such CAN bus nodes belongs to one lift/thrust unit being located at one of the main wings and to one lift/thrust unit being located at one canard wing on the aircraft side opposite to the respective main wing.

If the lift/thrust units at the main wings on the one hand and the lift/thrust units at the canard wings on the other hand, are of a different type, such a self-configuration of a respective CAN bus node for these lift/thrust units after mounting and complete installation at one of these mounting positions is enabled as well. Based on bus messages that indicate directly or indirectly the CAN bus over which the respective bus message is transmitted, a self-configuration procedure of the CAN bus nodes may determine the pair of CAN busses the respective bus node was connected with in the installation and consequently the respective main or canard wing and the mounting position at the respective main or canard wing. To this end, pre-configuration data stored in a memory of the respective bus node may indicate, whether the respective lift/thrust unit is a unit for a main wing or a unit for a canard wing. This pre-configuration information together with the pair of CAN busses the respective bus node was connected with in the installation indicates clearly and unambiguously the respective main or canard wing and the mounting position at the respective main or canard wing at which the lift/thrust unit was mounted and installed. This is a non-limiting example for an automatic location identification and corresponding self-configuration of plural propulsion units (lift/thrust units) in a distributed propulsion system as well.

If the lift/thrust units at the main wings and at the canard wings are of the same type, however, the respective pair of CAN busses each of these CAN bus nodes cannot indicate clearly and unambiguously the respective wing and the mounting position at the respective wing each of these other CAN bus nodes is installed. However, it can be considered to indicate to these CAN bus nodes in a different manner, for example by a simple configuration pin being set on the harness, at which wing type, i.e. main wing or canard wing, the respective lift/thrust unit is located, to enable a self-configuration of a respective CAN bus node after mounting and complete installation at a respective mounting position. As already explained. this self-configuration could serve to determine the mounting position at the respective main wing or canard wing, based on the pair of CAN busses the bus node was connected with in the installation and CAN bus messages that indicate directly or indirectly the CAN bus over which the respective bus message is transmitted. This is a further non-limiting example for an automatic location identification and corresponding self-configuration of plural propulsion units (lift/thrust units) in a distributed propulsion system. Since the configuration pin must only code for the type of wing the lift/thrust unit is installed at, only a minor increase of weight and required mounting space results, so that nevertheless substantial advantages over prior art approaches are achieved.

The provision of such a configuration pin is an example for a supplementary differentiating feature in the form of a configuration contacting that does not correspond to and cannot be derived from the allocation of the CAN busses to the CAN bus nodes.

There is another possibility for a differentiation between plural CAN bus nodes that are connected with the same pair of CAN busses, namely to assign the CAN busses of the respective pair differently to the CAN bus communication ports of the CAN bus nodes connected therewith. For example, assuming two CAN bus node N1 and N2 each having ports A and B and two CAN busses B1 and B2, CAN bus node N1 could have its port A connected with CAN bus B1 and it port B connected with CAN bus B2, and CAN bus node N2 could have its port A connected with CAN bus B2 and it port B connected with CAN bus B1. The explained self-configuration would be enabled for both CAN bus nodes. However, this approach is not implemented in the embodiment of FIGS. 1 and 2.

Figure 3:
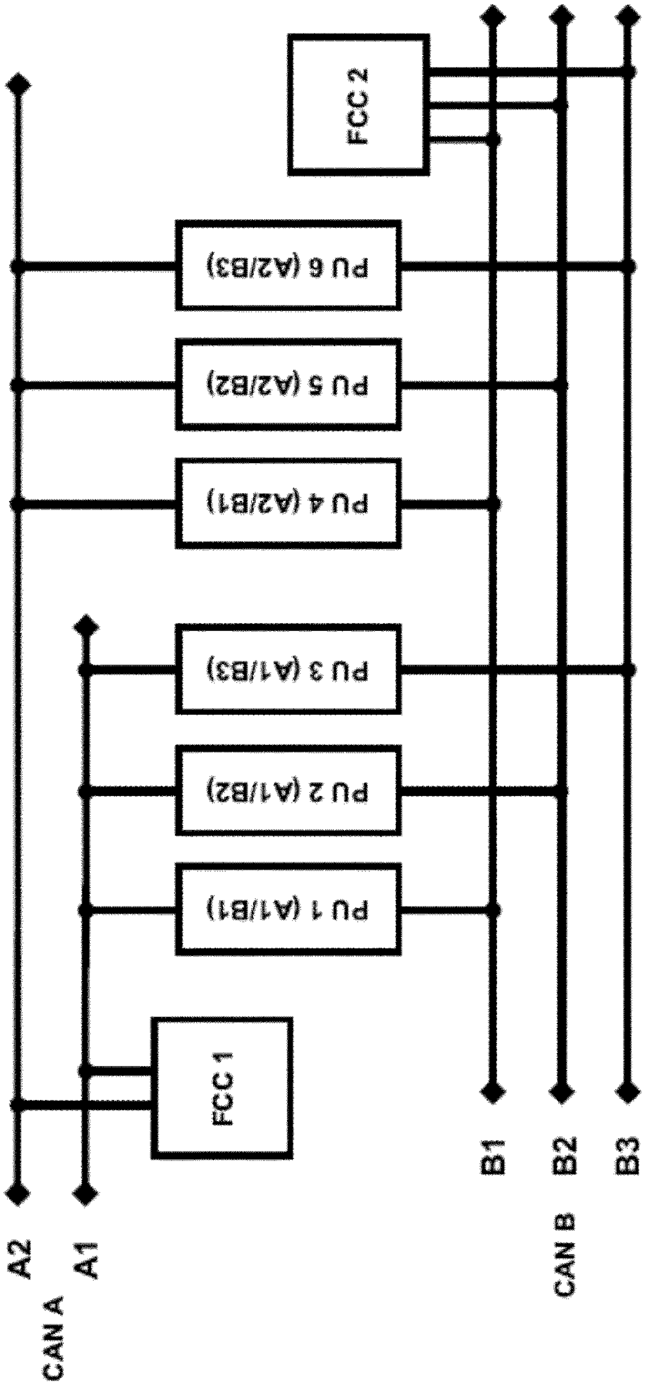
FIG. 3 shows an example of an alternate fault tolerant flight control system having a bus system structure and assignment of busses to individual bus nodes (or device bus nodes) such that each bus node is connected with an unique combination of busses.

FIG. 3 shows an example of an alternate fault tolerant flight control system having a redundant flight control computer system comprising at least two flight control computer nodes FCC 1 and FCC2 and having a redundant CAN bus system comprising at least two CAN bus sub-system CAN A and CAN B. The assignment of CAN busses to individual bus nodes is such that each bus node is connected by an unique combination of busses to the flight control computer system.

Each of the shown propulsion units (or lift/thrust units) PU 1 to PU 6 is connected to an unique pair of busses being formed by one bus of the CAN bus sub-system CAN A having two CAN busses A1 and A2 and being associated to a first flight control computer node FCC 1 and by one bus of the CAN bus sub-system CAN B having three CAN busses B1, B2 and B3 and being associated to a second flight control computer node FCC 2. By introducing more busses in one or both of CAN A and CAN B, more propulsion units could be controlled by the flight control computer system based on a respective unique combination of busses to which each propulsion unit of bus node is connected. The flight control computer system of FIGS. 1 and 2 could be enhanced based on the approach illustrated in FIG. 3, so that all lift/thrust units are connected by an unique combination of busses to the flight control computer system, to allow a complete automatic location identification and corresponding self-configuration of the propulsion units (lift/thrust units) in a distributed propulsion system based on the assignment of busses to the propulsion unit bus nodes alone.

However, an automatic location identification as basis for the self-configuration of bus nodes in a distributed system as provided by the present invention is only an example, however a particular relevant example. This can be explained with reference to the well-known identifier structures of ARINC 825 CAN bus messages and the usual logical communication channel assignment as shown in FIGS. 4 and 5.

ARINC 825 builds on CANaerospace in many respects with regard to the communication mechanisms, but uses only extended (29-bit) identifiers. This means that some of the identifier bits can be used to map the large number of different systems typical of commercial aviation and to ensure interoperability even in very complex systems.

The CAN specification provides that transmitted CAN messages are basically received by all connected bus nodes, a communication principle also known as "Anyone-to-Many" (ATM). The advantage of this concept is the inherent data consistency between all bus participants. Both periodic and aperiodic sending of messages during normal operation are possible. The disadvantage of basing the CAN specification exclusively on ATM is that by definition there is no subscriber addressing for CAN, which in turn is the basis for "Peer-to-Peer" (PTP) communication. However, for use in the aviation sector with its high requirements for continuous system monitoring, the possibility to communicate with individual bus nodes is extremely important. ARINC 825 therefore provides the necessary protocol functions to enable PTP communication. Furthermore, this enables the implementation of additional functions of ISO/OSI layers 3, 4 and 6, which in turn allows the creation of logical communication channels (LCC) and corresponding communication types (ATM, PTP), as shown in FIG. 5.

The simultaneous use of ATM and PTP communication for CAN requires the introduction of different network layers that allow independent communication. These network layers are created by ARINC 825 by grouping the CAN identifiers as shown in FIG. 5. The resulting structure creates logical communication channels (LCC) and assigns them a specific communication type (ATM, PTP). User-defined LCCs give the user great freedom to implement ARINC 825 according to his needs.

In addition, for ARINC 825 the 29 bits of the identifier (c.f. FIG. 4) are subdivided into further fields, which have the following meaning:

The Function Code Identifier (Source FID or Server/Client FID) identifies the system or subsystem in which the message in question originates, in the case of the Server FID also the receiving system or subsystem. The FID largely corresponds to the Air Transport Association (ATA) chapters used in aviation for many decades, whereby the ARINC 825 specification assigns ATA chapters to the corresponding identifier bit combination (and the associated message priority) according to the importance of the individual aircraft systems. In addition, various FIDs are reserved, for example, for temporary test/maintenance systems or for use by other ARINC 825-based standards. The use of defined FIDs is mandatory for all communication channels except UDC and FMC.

The Reserved/Service Message Type (RSD/SMT) bit is always 0 for ATM communication, while for PTP communication it indicates the direction of data transfer between client and server. For service requests (i.e. messages sent by the client), this bit is set to 1, while for server responses it is set to 0.

The Local Bus Only (LCL) bit is set to 1 for messages that are to remain within the relevant network segment and are not to be passed through gateways to other networks.

The Private (PVT) bit is set to 1 for messages that have no meaning for bus participants that have not been explicitly programmed to process these messages. Messages in which the PVT bit is set are usually not described in the communication profile database and are only intended for "private" use between selected bus participants.

The Data Object Code (DOC) for ATM communication specifies the parameter sent with the message. The exact description of all parameters with regard to their properties (physical unit, data type, repetition rate, etc.) are described in the corresponding communication profile database.

The Redundancy Channel Identifier (RCI) defines to which redundancy channel the respective message is to be assigned. ARINC 825 thus supports redundant systems up to degree four, whereby the RCI allows, for example, redundant messages to be sent on a single bus and thus redundancy jumps in the system to be easily overcome.

The Server Identifier (SID) defines the bus subscriber (or a corresponding function in a bus subscriber), which provides a service that can be used within the framework of the Node Service Concept on the basis of PTP communication. The connection of SID, Server FID and RCI together form a Node Identifier (NID). This NID ensures the unique addressing of a server in the network.

In addition to the "normal" data flow in a system, PTP communication allows interactions between individual bus participants to be established temporarily or permanently and also to be dissolved again, thus enabling network services on a "client/server" basis. Several of these interactions can run in parallel, and each bus participant can simultaneously be a client for certain interactions and a server for others. With the help of this mechanism, called "Node Service Concept" in ARINC 825, it is possible, for example, to distribute system functions transparently across different participants in the network or to control the dynamic reconfiguration of an entire system to increase reliability in the event of a fault. The Node Service Concept distinguishes between connection-oriented and connectionless interactions, similar to TCP/IP and UDP/IP for Ethernet.

CAN bus communications according to the "Anyone-to-Many" (ATM) principle as well as according to the "Peer-to-Peer" (PTP) principle are based fundamentally on the identifiers of the CAN bus messages. Each CAN bus node is configured to receive all CAN bus messages transmitted over the CAN bus to which the CAN bus node is connected and to listen at least to the identifiers of all these CAN bus messages transmitted over the CAN bus. If the CAN bus nodes are connected to plural individual CAN busses as is the basis for the present invention, then the CAN bus nodes are configured to receive all CAN bus messages transmitted over the plural CAN busses to which the CAN bus node is connected and to listen at least to the identifiers of all these CAN bus messages transmitted over these CAN busses.

The can bus nodes are further configured to process the identifiers of all these CAN bus messages, to decide whether a respective CAN bus message is relevant for the respective CAN bus node, e.g. because the CAN bus message calls to perform an action. The CAN bus nodes are further configured to process payload data of a respective bus message if it the respective CAN bus nodes decides that the CAN bus message is relevant.

For deciding on the relevance of CAN bus messages being received and for processing the payload data of relevant bus messages, the CAN bus nodes must have individual configuration data available. By processing the identifies of CAN bus messages based on such individual configuration data, each CAN bus node can identify those CAN bus messages that are relevant for the respective CAN bus node, and for CAN bus messages determined to be relevant, the respective CAN bus node is further enabled to appropriately process the payload data of the respective CAN bus message, based on at least one or both of the identifier of the respective CAN bus message and the individual configuration data.

In case of plural aircraft devices or propulsion units (lift/thrust units) of the same type, the needed individual configuration data for their bus nodes may comprise first configuration data that may be included in pre-configuration data of the CAN bus nodes and may be stored in a memory of the respective CAN bus node from the start. These pre-configuration data may be the same for all these CAN bus nodes. Additional second configuration data of the individual configuration data may be determined by each of the CAN bus nodes by performing a self-configuration procedure as explained on basis of the automatic location identification and corresponding self-configuration. The self-configuration procedure may provide that the additional second configuration data are stored in the memory of the respective CAN bus node, for being available for the further operation of the CAN bus node.

However, it is not required that this self-configuration involves directly or indirectly a kind of location identification, although this will typically be the case at least indirectly, if plural aircraft devices or propulsion units (lift/thrust units) of the same type are installed in an aircraft in a distributed manner. However, the automatic self-configuration could involve only the determination of an identification number or the like that indicates which set of plural sets of pre-stored individual configuration data of the pre-configuration data is the set of individual configuration data the respective CAN bus node shall use in operation, to decide on the relevance of received bus messages and to process the payload data of bus messages decided to be relevant.

Figure 6:
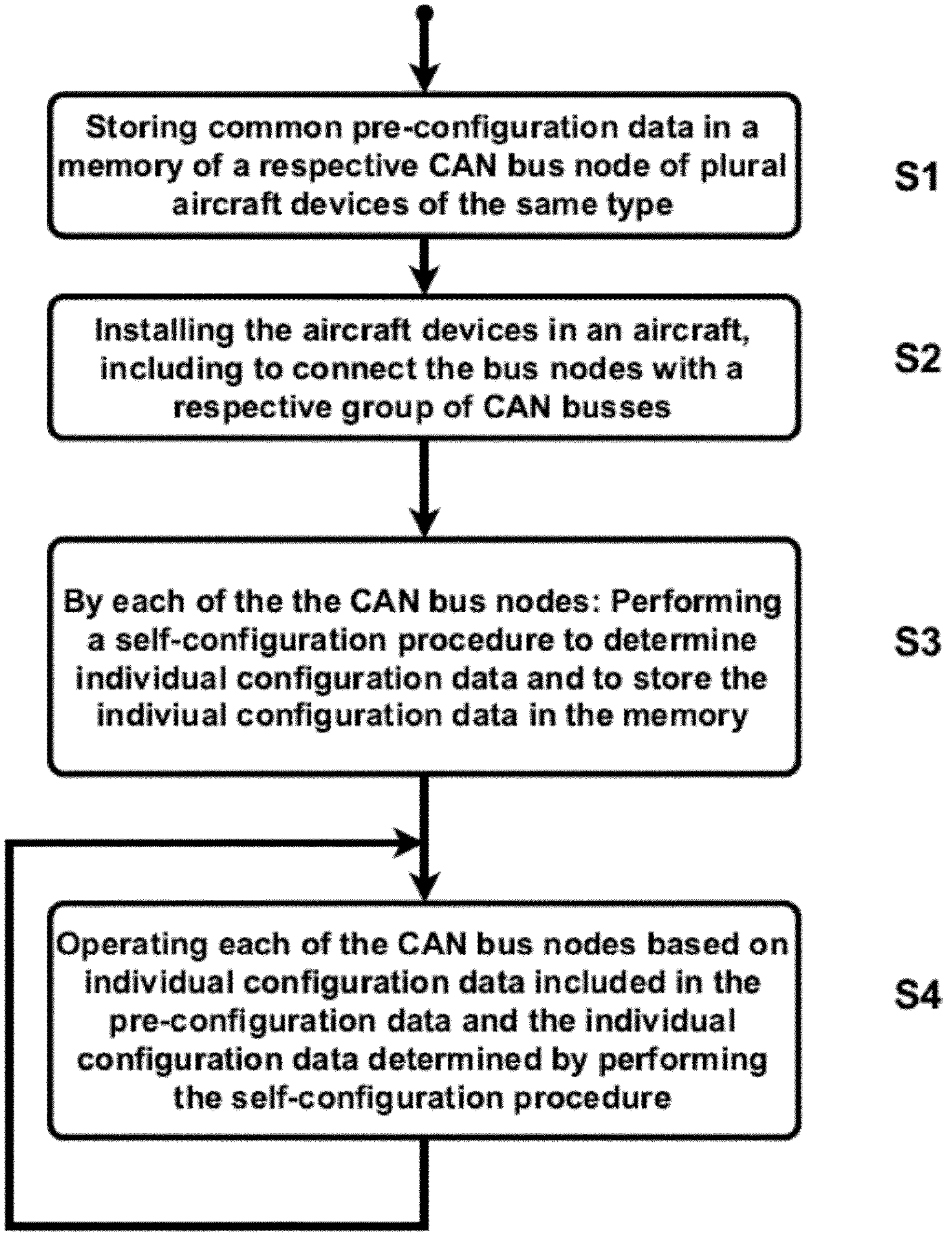
FIG. 6 shows a flowchart representing an example of a configuration procedure for configuring plural CAN bus nodes of a common type.

FIG. 6 shows a flowchart of a corresponding overall process or method as a nonlimiting example.

According to step S1, pre-configuration data are stored in the memories of the CAN bus nodes of plural aircraft devices of the same type, for example propulsion units that shall be installed in a distributed manner in an aircraft to provide a distributed propulsion system. These pre-configuration data may comprise first configuration data as mentioned.

According to step S2, the aircraft devises are mounted at the various mounting positions of the aircraft and installed at the respective mounting position, including to connect the CAN bus node of the respective aircraft device with an associated respective group of CAN busses. The assignment of the aircraft devices to the various mounting positions can be done in a completely arbitrary manner.

According to step 3, the aircraft devices, more precisely the CAN bus nodes of the aircraft devices, respectively perform a self-configuration procedure, to determine individual configuration data, possibly second configuration data as mentioned, and to store these individual configuration data in the memory.

Step 4 represents the normal operation of the respective aircraft device based on the individual configuration data that are now available in the memory of its CAN bus node. As already explained, this normal operation includes to listen to the identifiers of received CAN bus message, to decide on the relevance of the CAN bus message based on the identifiers and certain individual configuration data available in the memory and to process payload data of CAN bus messages determined to be relevant, wherein the processing of the payload data is typically based on certain content of the identifier of the respective CAN bus message and certain individual configuration data available in the memory.

Figure 7:
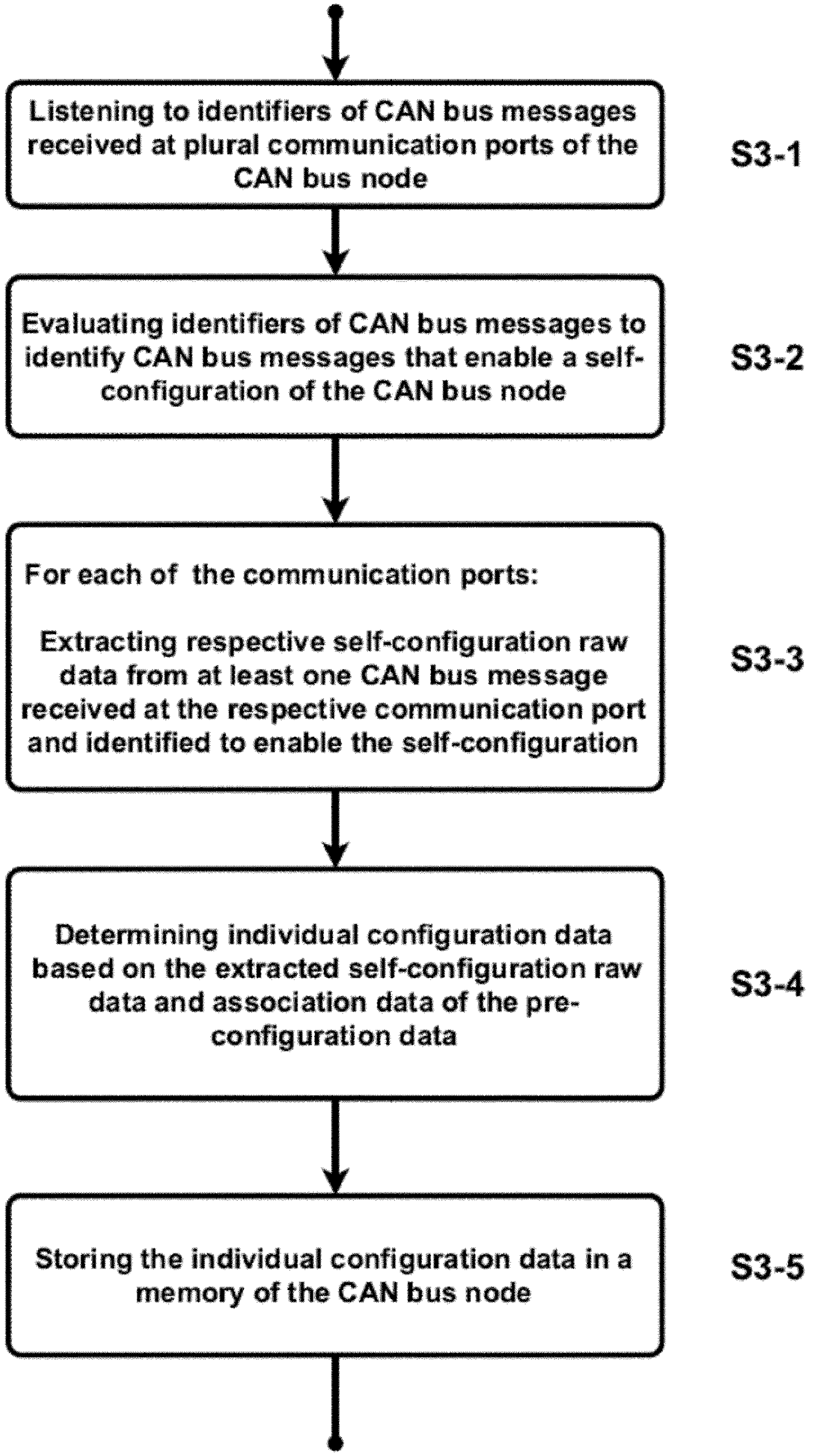
FIG. 7 shows a flowchart representing an example of a self-configuration procedure of a respective CAN bus node, wherein the self-configuration procedure is a sub-procedure of the configuration procedure being illustrated in FIG. 6.

FIG. 7 shows a flowchart of a corresponding self-configuration a respective CAN bus node may perform according to step 3, again only as a non-limiting example. According to step S3-1, the CAN bus node listens to identifiers of CAN bus message on at least two of its plural communication ports. Preferably the CAN bus nodes has only two communication ports, but more than two communication ports are not ruled out.

According to step S3-2, the CAN bus node evaluates identifiers of received CAN bus messages, to identify CAN bus messages that enable a self-configuration. In principle, all CAN bus messages transmitted via the respective CAN bus or at least all CAN bus messages originating from the flight control computer could enable the self-configuration. However, it may be the case that only particular configuration CAN bus messages include the information needed for the self-configuration.

According to step S3-3, the CAN bus node extracts, for each of said at least two communication ports, self-configuration data from at least one suitable CAN bus message.

According to step S3-4, the CAN bus node determines individual configuration data, possibly second configuration data as mentioned, from the extracted self-configuration raw data.

According to step S3-5, the CAN bus node stores these individual configuration data in its memory.

Figure 8:
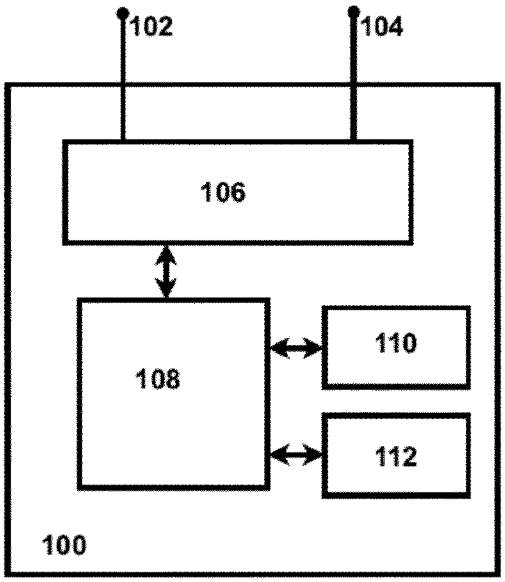
FIG. 8 shows schematically an example structure of a CAN bus node.

A suitable but non-limiting structure of a CAN bus node configured to perform such a self-configuration procedure is schematically illustrated in FIG. 8. The CAN bus node 100 has two CAN bus communication ports 102 and 104 to be connected to a pair of CAN busses. The two CAN bus communication ports belong to a CAN bus transceiver 106 that interacts with a processor 108 of the CAN bus node. The CAN bus transceiver 106 may comprise two independent CAN bus transceiver units, one for port 102 and the other for port 104.

The processor 108 is bidirectionally connected with RAM memory 110 and FLASH memory 112 of the CAN bus node. The FLASH memory may hold the mentioned pre-configuration data, and may also serve to store the individual configuration data obtained by performing the self-configuration. The FLASH memory or alternatively additional ROM memory may hold executable program code data, to be executed by the processor, for performing the self-configuration procedure and an operation procedure of the CAN bus node after the self-configuration. The usual CAN bus arbitration and CAN bus communications handling may be performed by functionalities of the transceiver 106, based on communication configuration data supplied by the processor 108 to the transceiver 106 based on the self-configuration.

In the following, a more detailed example for CAN bus communications and an underlying CAN bus node self-configuration involving a kind of automatic location identification is given. Based on ARINC 825 but differing therefrom in some details, CAN bus messages having identifiers with the "Anyone-to-Many" structure of FIG. 4 are used for the CAN bus communications in a CAN bus system with three flight control computer nodes FCC1, FCC2 and FCC3 like FIGS. 1 and 2. However, the system of FIGS. 1 and 2 may be enhanced according to the concept of FIG. 3, so that each CAN bus node of the lift/thrust units or propulsion units (PUs) is connected to a unique pair of CAN busses.

According to this example, in CAN bus messages originating from the three flight control computer nodes, the function code identifier (FID) is an unique combination of the FCC number (here 1 to 3) and a bus number, e.g. 1 to 12, if all busses of CAN A and CAN B are counted commonly.

The FID scheme for the flight control computer nodes may be as follows:

| Bit range | Meaning |
|---|---|
| 6 | Source type: 0 for FCCs |
| 4-5 | FCC number: 1 = FCC1, 2 = FCC2, 3 = FCC3 |
| 0-3 | Bus type and Bus ID:<br>1 to 6: busses 1 to 6 of CAN A; 7 to 12: busses 1 to 6 of CAN B |

Since the FID includes information on the bus type and the bus ID according to this FID scheme, any CAN bus message transmitted by a respective one of the flight control computer bus nodes FCC1, FCC2 and FCC3 is suitable that a CAN bus node of a respective propulsion unit (lift/thrust unit) extracts this information as self-configuration raw data when performing a self-configuration procedure as considered in the foregoing. Payload data of a respective CAN bus message may be irrelevant in this context. No dedicated configuration CAN bus messages are required, but could nevertheless be used, if the self-configuration shall configure certain parameter or the like that are not already included in pre-configuration data of the CAN bus node.

For CAN bus messages originating from the propulsion units (lift/thrust units), an FID scheme as follows may be used, which is based on a numbering scheme dividing the propulsion units in groups of six:

| Bit range | Meaning |
|---|---|
| 6 | Source type: 1 for propulsion units (PUs) |
| 3-5 | Block of respective six neighboring PUs:<br>1 = left canard, 2 = right canard, 3 = inboard left aft wing, 4 = outboard left aft wing, 5 = inboard right aft wing, 6 = outboard right aft wing |
| 0-2 | PU position on respective block, from 1 to 6, starting to count from the most inboard PU (1) to the most outboard PU (6) |

According to a favorable approach, in CAN bus messages originating from the flight control computer nodes, the DOC field of the message identifier may used to address one or plural propulsion units. To improve bandwidth usage, some messages may be multicast (depending on the bus type, e.g. three or six flaps). To this end, the four most significant bits (MSB) of the DOC may be reserved for addressing. If the MSB is 0, the next three bits are a multicast address, wherein the mapping is defined by associated configuration data. If the first bit is 1, the next three bits identify a single flap or engine. The remaining ten bits are used for the message ID. This message ID scheme for PU messages may be summarized as follows:

| Bit range | Meaning |
|---|---|
| 13 | Address ID: 0 = multicast, 1 = unicast |
| 10-12 | Multicast or unicast address |
| 0-2 | Message ID |

Figure 9:
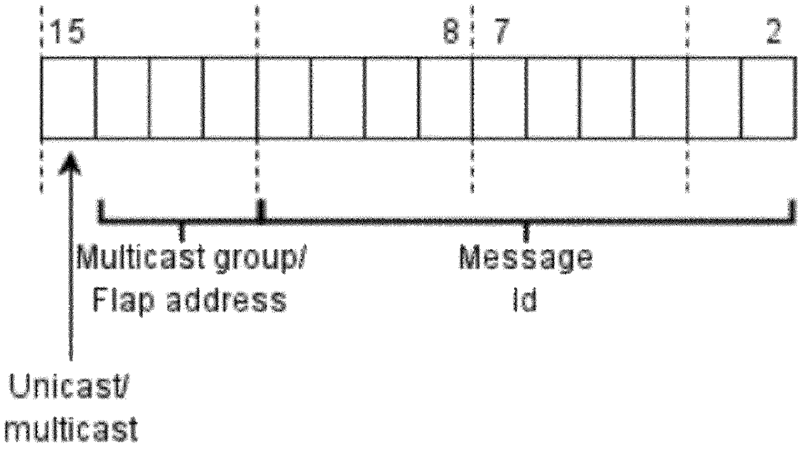
FIG. 9 shows an example of a possible assignment of bit ranges of a DOC field of the identifier of CAN bus messages.

The DOC field of CAN bus messages originating from one of the flight control computer nodes may be such as is illustrated in FIG. 9.

For being able to process the DOC field, the CAN bus nodes of the propulsion units must be aware of their respective individual unicast address as well as of the multicast address or multicast addresses that address the respective CAN bus node together with respective other of the bus nodes. Further, for sending CAN bus messages over the CAN bus system, the CAN bus nodes must be aware of their respective FID.

For the unicast and multicast addresses, a different scheme than for the FIDs may be used. The scheme for the unicast and multicast addresses may favorably be a separate scheme for each of the CAN busses of CAN A and CAN B, so that less bits are needed for coding the addresses. This enables the indicated addressing using the bit range 13 to 12 of the DOC field. For example, the unicast addresses may simply be based on a certain numbering of the CAN bus nodes in the same CAN bus. Further, the multicast address 0 may indicate a first group of three PUs (e.g. the three lowest PUs according to said certain numbering) as target PUs in the respective CAN bus, the multicast address 1 may indicate a second group of three PUs (e.g. the three highest PUs according to said certain numbering) as target PUs in the respective CAN bus, and the multicast address 7 may indicate all PUs in the respective CAN bus as target PUs.

By means of or based on the self-configuration of the CAN bus nodes according the present invention, the CAN bus nodes of the PUs may determine their respective PU number in each of the at least two busses the respective CAN bus node is connected with after installation in the aircraft, and therewith the unicast address belonging to the CAN bus node and the multicast addresses relevant for the respective CAN bus node. Further, the CAN bus nodes may determine based on this self-configuration their respective FID to be used when sending CAN bus messages.

Further, concerning CAN bus messages indicating multicast addresses in their DOC field, the CAN bus nodes may determine based on this self-configuration a particular portion of payload data that is relevant for the respective CAN bus node.

For example, CAN bus messages having multicast addresses may use the following message IDs:

| Message ID | Name | Meaning |
|---|---|---|
| 0 | Mode and flap command | A multicast message conflating a certain mode request and a flap command for a group of three PUs (in the present example, to be used according to the CAN 2.0B bus communication protocol on CAN A) |
| 1 | Engine command | A multicast message conflating an engine RPM command of a group of three PUs (in the present example, to be used according to the CAN 2.0B bus communication protocol on CAN A) |
| 2 | Integrated command | A message conflating the mode request, the flap command and the engine RPM command for six PUs (in the present example, to be used according to the CAN FD bus communication protocol on CAN B) |

The propulsion units or lift/thrust units mentioned earlier and shown schematically in FIGS. 1 and 3 each comprise a respective flap and a respective engine.

Figure 10:
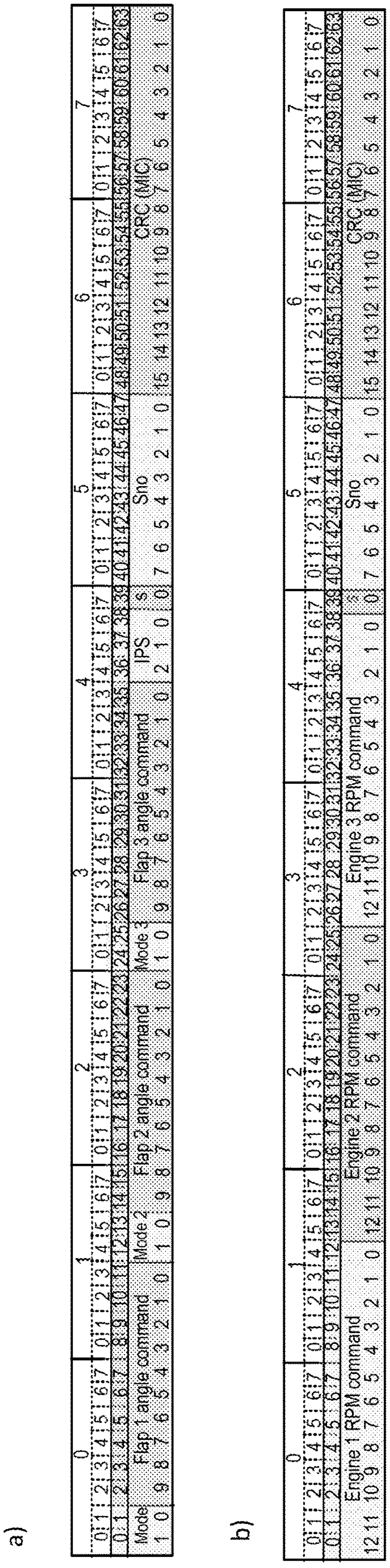
FIG. 10 shows in sub-figs a) and b) two examples of a possible assignment of bit ranges of the message payload data of multicast CAN bus messages of a first kind.

FIG. 10 *a*) shows a first example of a command word of the payload data, with the mode request and the flap angle command for three flaps, having the message ID 0. FIG. 10 *b*) shows a second example of a command word of the payload data, with the engine RPM command for three engines, having the message ID 1. Such command words are intended to be used on CAN A according to the CAN 2.0 bus protocol, but it is not ruled out that such command words are also used on CAN B according to the CAN FD protocol.

Figure 11:
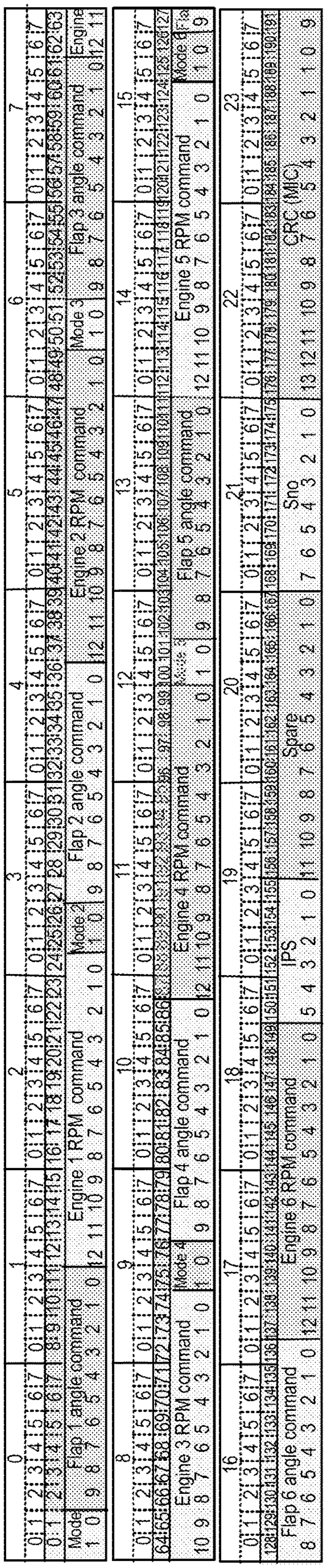
FIG. 11 shows an example of a possible assignment of bit ranges of the message payload data of multicast CAN bus messages of a second kind.

FIG. 11 shows a third example of a command word of the payload data, with the mode request, the flap angle command and the engine RPM command for six flaps and six engines, having the message ID 3. According to the present example, such command words are only available on CAN B according to the CAN FD bus communication protocol.

Based on the self-configuration according to the present invention, each CAN bus node of the propulsion units (lift/thrust units) may be configured to access and process the correct portion of the payload data of a respective multicast CAN bus message that addresses the respective CAN bus node in the DOC field.

A self-configuration procedure performed by a CAN bus node of the fault tolerant flight control system of FIG. 3 may be exemplified by example pseudo-code as follows. According to this example, CAN bus messages analogous to the CAN bus messages being based on ARINC 825 as considered in the foregoing are assumed, with bus IDs 1 to 5, wherein IDs 1 and 2 indicate busses A1 and A2 of CAN A and IDs 3 to 5 indicated busses B1 to B3 of CAN B. The bus nodes PU 1 to PU 6 have their first communication port ("Port 1") connected with CAN A and have their second communication port ("Port 2") connected with CAN B.

```
REPEAT
  SET Message_from_FCC as FALSE
  ACCESS CAN bus message received at Port 1
  READ Identifier of CAN bus message
  EXTRACT FID of the Identifier
  IF Source type of FID = 0
          SET Message_from_FCC as TRUE
  ELSE
          DISCARD CAN bus message
  ENDIF
UNTIL Message_from_FCC = TRUE
/ Comment:  At the first communication port a CAN bus message
            originating from FCC 1 was received that allows
            self-configuration.
SET Raw1 as EXTRACT Bus ID from FID
/ Comment:  The variable Raw1 is set to the bus ID of the CAN bus
            node is connected with at its first communication port.
REPEAT
  SET Message_from_FCC as FALSE
  ACCESS CAN bus message received at Port 2
  READ Identifier of CAN bus message
  EXTRACT FID of the Identifier
  IF Source type of FID = 0
          SET Message_from_FCC as TRUE
  ELSE
          DISCARD CAN bus message
  ENDIF
UNTIL Message_from_FCC = TRUE
/ Comment:  At the second communication port a CAN bus message
            originating from FCC 2 was received that allows
            self-configuration
SET Raw2 as EXTRACT Bus ID from FID
/ Comment:  The variable Raw2 is set to the bus ID the CAN bus node is
            connected with at its second communication port.
IF Raw1 = 1
  IF Raw2 = 3
          SET Identity as PU 1
  ENDIF
  IF Raw2 = 4
          SET Identity as PU 2
  ENDIF
  IF Raw2 = 5
          SET Identity as PU 3
  ENDIF
ENDIF
IF Raw1 = 2
  IF Raw2 = 3
          SET Identity as PU 4
  ENDIF
  IF Raw2 = 4
          SET Identity as PU 5
  ENDIF
  IF Raw2 = 5
          SET Identity as PU 6
  ENDIF
ENDIF
/ Comment:  The variable Identity is set to the PU number of the
            respective bus node as is indicated in FIG. 3.
STORE Identify in memory of the bus node
/ Comment:  The PU number is now available for the following
            operation of the bus node and of the propulsion unit the
            CAN bus node belongs to.
```

After having performed a part of the self-configuration procedure that corresponds to this pseudo-code, the CAN bus node has obtained the necessary information allowing the CAN bus node to operate properly in the fault tolerant flight control system. The PU number indicates clearly and unambiguously the location of the respective propulsion unit and possibly a certain operation parameter set underlying the operation of the propulsion unit based on CAN bus messages received from the respective FCC.

Based on this self-configuration, the CAN bus node is enabled to properly interpret the further content of the identifier and to properly access and interpret payload data of unicast and multicast CAN bus messages transmitted over the respective CAN bus of CAN A and CAN B, and is enabled to include the correct FID in the identifier of CAN bus messages the CAN bus node transmits over the respective CAN bus of CAN A and CAN B.

There are of course many possibilities how a part of the self-configuration procedure that corresponds to this pseudo-code could be implemented and coded in detail, to reveal first the two bus IDs as self-configuration raw data and then to determine the PU number as individual configuration data, from which further individual configuration may be derived. Referring to the schematic example embodiment of FIG. 8, the self-configuration procedure may make appropriately use of functionalities of the CAN bus transceiver 106. The skilled person is aware of the functionalities such a CAN bus transceiver 106 or its individual CAN bus transceiver units connected with the ports 102 and 104 have according to the state of the art, and how these functionalities can be used to implement the self-configuration procedure of CAN bus nodes according to the present invention.

Figure 12:
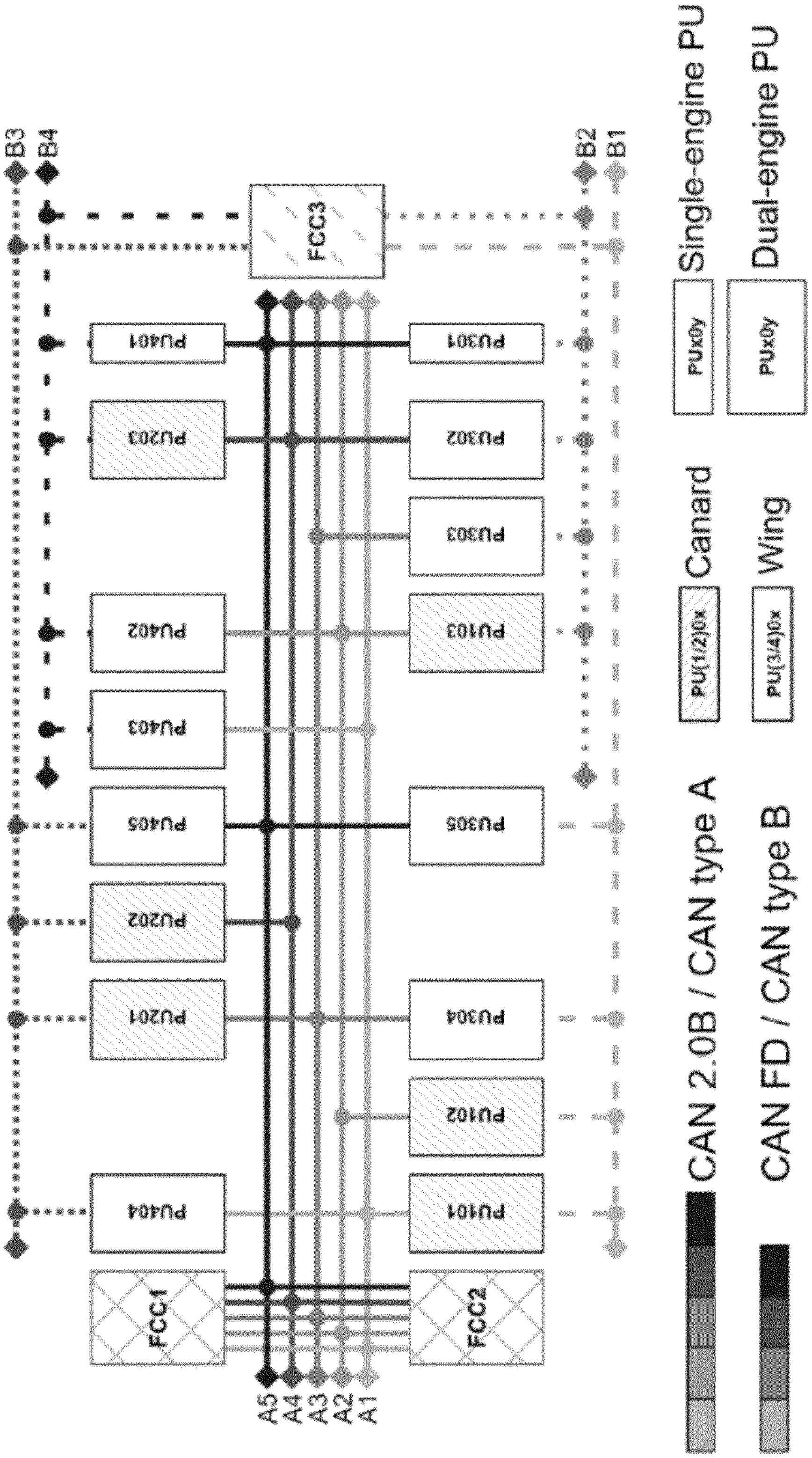
FIG. 12 shows a further example of a fault tolerant flight control system having a bus system structure and assignment of busses to the bus nodes such that each bus node (or device bus node) is connected with a unique combination of busses.
Figure 13:
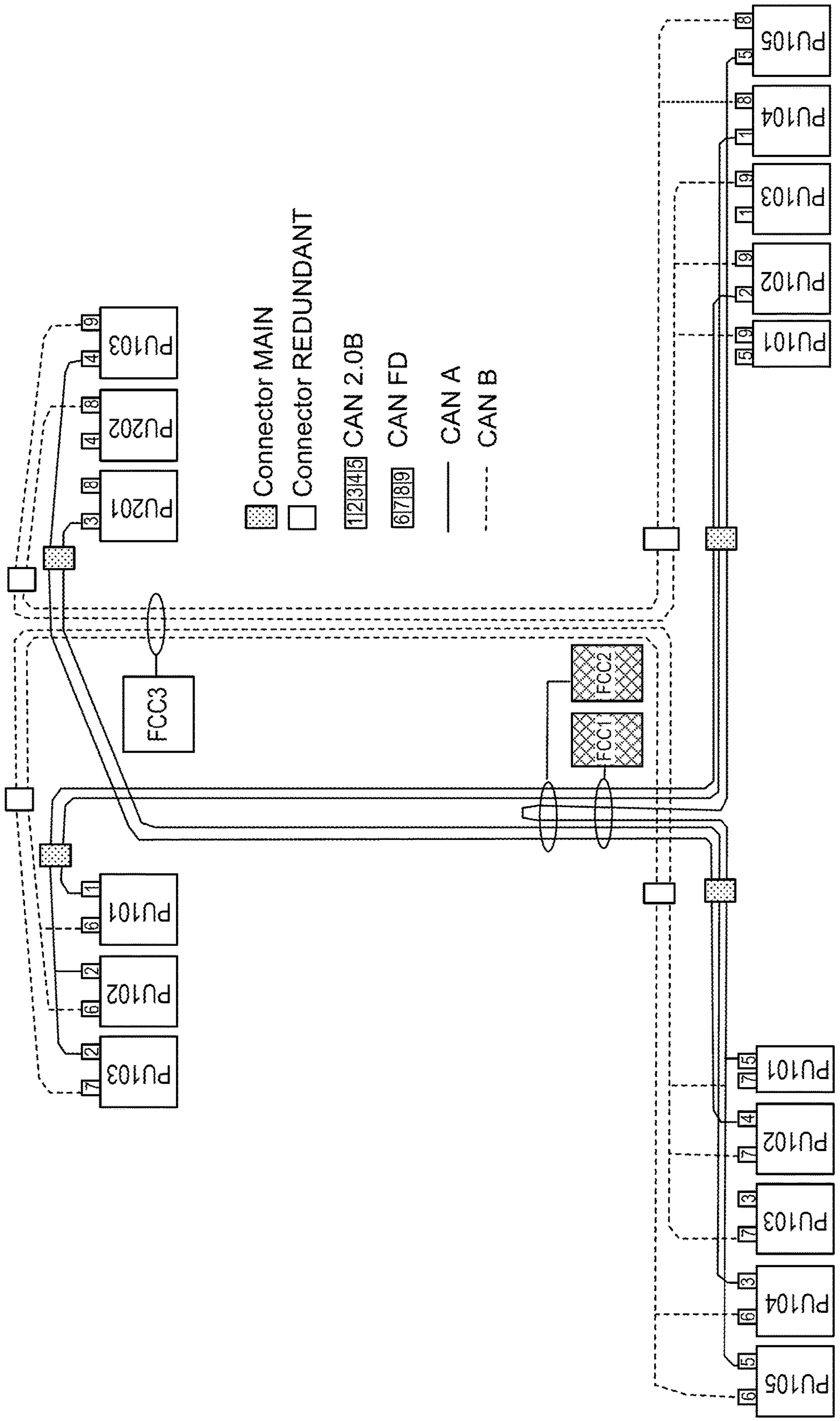
FIG. 13 shows the implementation of the flight control system according to FIG. 12 in a different manner, to show also the position relation between various lift/thrust units with respect to each other and along a respective main wing or canard wing of the aircraft.

A further flight control system that combines favorable aspects of the embodiment of FIGS. 1 and 2 and of the embodiment of FIG. 3 is shown in FIGS. 12 and 13.

Sixteen lift/thrust units or propulsion units (PUs) are provided. PUs PU101, PU102, PU103 are located at the left front wing or canard, PUs PU201, PU202 and PU203 are located at the right front wing or canard, PUs PU301, PU302, PU303, PU304 and PU305 are located at the left main wing or aft wing, and PUs PU401, PU402, PU403, PU404, PU405 are located at the right main wing or half wing. PUs PU301 and PU401 are single engine PUs and the other PUs are dual engine PUs.

Each PU is connected with a different combination of two CAN busses the CAN bus system, namely with one CAN bus of the CAN bus sub-system CAN A and one CAN bus of the CAN bus sub-system CAN B.

The CAN bus sub-system CAN A has five CAN busses A1 to A5 and the CAN bus sub-system CAN B has four CAN busses B1 to B4. All CAN bus communications via all CAN busses of CAN A preferably are based on the same CAN bus communication protocol, namely CAN 2.0B.

All CAN bus communications via all CAN busses of CAN B preferably are based on the same CAN bus communication protocol, namely CAN FD. In particular, the CAN bus communication approach based on ARINC 825 of the more detailed example given in the foregoing with reference to FIGS. 9 to 11 and the above tables may be used for the CAN bus system with three flight control computer nodes FCC1, FCC2 and FCC3 shown in FIGS. 12 and 13, with obvious adaptations concerning the number of CAN busses and the number of PUs.

The self-configuration of bus nodes according to the present invention may also be applied to completely different kinds of bus nodes and completely different kinds of bus systems.

For example, an aircraft may have plural battery management modules or battery management control cards (BMCC), for example six such BMCCs, that are numbered from 1 to 6.

Each BMCC could have two interfaces denoted as interface A and interface B. These interfaces may be RS-485 interfaces.

For redundancy purpose, three generic input/output data concentrators (GIODs) may be provided, with each GIODs having one RS-485 bus, that are respectively denoted as bus 1, bus 2 and bus 3.

The BMCCs can each be connected with an unique combination of these busses, for example according to the following illustrative assignment of busses to the respective interfaces A and B:

| BMCC # | Interface A | Interface B |
|---|---|---|
| 1 | Bus 1 | Bus 2 |
| 2 | Bus 1 | Bus 3 |
| 3 | Bus 2 | Bus 3 |
| 4 | Bus 2 | Bus 1 |
| 5 | Bus 3 | Bus 1 |
| 6 | Bus 3 | Bus 2 |

Based on this scheme, a self-configuration of the BMCCs analogous to what is described in the foregoing is enabled. This can favorably be facilitated if the RS-485 messages include information on the bus identity, namely the identity of the respective bus over which the message was sent, in the respective RS-485 message. For example, the message IDs may carry information of the bus identity.

Therewith, the BMCCs are enabled to configure themselves with respect to BMCC identity or BMCC locations and the like.

Referring to the embodiment of FIGS. 12 and 13, each of the PUs could have associated its own battery being provided with a respective BMCC, so that at least 16 BMCCs might require a configuration for being properly integrated in the distributed power distribution system. Therefore, the proposed self-configuration of BMCCs or other distributed components of the power distribution system according to the invention provides analogous advantages like the self-configuration of the PUs.

For example, the self-configuration of the invention may analogously be applied to power switching or power circuit protection devices such as so-called Solid-State Power Controllers (SSPCs) over which the PUs receive electrical operating power. For example, each PU may have associated its own SSPC, and additional SSPCs may be provided for achieving load sharing, possibly time variable electrical load sharing, possibly as is disclosed in EP 3 998 687 A1 and EP 3 998 201 A1, to name favorable examples. Further, additional SSPCs may be used to power other loads than the PUs. Therefore, the application of the self-configuration according to the present invention to such SSPCs or other power switching or power circuit protection devices will bring important benefits, analogously to what was explained and discussed with respect to the self-configuration of the PUs and the BMCCs.

A device bus node (PU 1; PU 2; PU 3; PU 4; PU 5; PU 6) associated or belonging to an aircraft device has a plurality of communication ports for being connected with a respective bus of an electronic or optoelectronic bus system (CAN A, CAN B) of a flight control system of an aircraft. The device bus node is configured to receive via its communication ports and the busses connected therewith bus messages from at least one flight control computer bus node (FCC 1; FCC 2) of a flight control computer system of the flight control system. The device bus node is configured to perform a self-configuration procedure after that each of its communication ports was connected with a respective different one of the busses (A1, A2, B1, B2, B3) of the electronic or optoelectronic bus system, for being fully operational in the flight control system, wherein the self-configuration procedure determines, based on bus messages received at its communication ports, at least part of individual configuration data being associated to the device bus node as part of the flight control system and being needed by the device bus node to enable a processing of a respectively received bus message.

Herewith also the following items are disclosed:

1. Flight control system for an aircraft, comprising a flight control computer system (FCC1, FCC2, FCC3; FCC 1, FCC 2) that is connected via an electronic or optoelectronic bus system (22; CAN A, CAN B) with a plurality of device bus nodes (1.1, 1.2, . . . 4.12; PU 1, PU 6; 100; PU101, . . . PU405), which each are configured to at least one of controlling an associated aircraft device based on command messages received from the flight control computer system via the bus system and sending information messages to the flight control computer system via the bus system;
   wherein the electronic or optoelectronic bus system is a redundant electronic or optoelectronic bus system (22; CAN A, CAN B) having plural busses;
   wherein each device bus node has plural communication ports (102, 104) being connected to a respective associated group of busses of the redundant electronic or optoelectronic bus system.
2. Flight control system according to item 1, wherein the device bus nodes are connected at their communication ports to the respective associated group of busses of the redundant electronic or optoelectronic bus system in a characteristic manner that differs between groups of the device bus nodes or in a unique manner that differs between the device bus nodes.
3. Flight control system according to item 2, wherein each of the device bus nodes has associated a characteristic group of busses of the redundant electronic or optoelectronic bus system, that differs between groups the device bus nodes, so that device bus nodes belonging to different groups respectively are connected at their communication ports with a different combination of busses of the electronic or optoelectronic bus system.
4. Flight control system according to claim 3, wherein at least one of a supplementary differentiating feature, possibly a configuration contacting, and an association of the busses of the characteristic group to the communication ports varies between the device bus nodes belonging to the same group.
5. Flight control system according to item 2, wherein each of the device bus nodes has associated a unique group of busses of the redundant electronic or optoelectronic bus system, that differs between the device bus nodes, so that the device bus nodes respectively are connected at their communication ports with a different combination of busses of the electronic or optoelectronic bus system.
6. Flight control system according to one of items 1 to 5, wherein the flight control computer system and the device bus nodes are configured to communicate with each other using at least one predetermined bus communication protocol that provides at least for bus messages sent by the flight control computer system that an identifier of the respective bus message specifies an identity of a particular bus of the electronic or optoelectronic bus system over which the respective bus message is transmitted.

7 Flight control system according to one of items 1 to 6, wherein the flight control computer system has plural flight control computer nodes (FFC1, FCC2, FCC3, FCC 1, FCC 2) and the flight control computer nodes and the device bus nodes are configured to communicate with each other using at least one predetermined bus communication protocol that provides for bus messages sent by a respective of the flight control computer nodes that an identifier of the respective bus message specifies an identity of the flight control computer node that has sent this bus message.

8. Flight control computer system according to one of items 1 to 7, wherein the electronic or optoelectronic bus system is a CAN bus system and the flight control computer system and the device bus nodes are configured to communicate with each other using at least one predetermined CAN bus communication protocol that provides for multicast addressing of plural of the device bus nodes as well as for unicast addressing of one particular device bus node.
9. Flight control computer system according to item 8, wherein the predetermined CAN bus communication protocol provides for multicast and unicast addressing of CAN bus messages using an anyone-to-many, ATM, identifier structure of the CAN bus messages, wherein a data object code, DOC, field of the identifier codes for the kind of addressing and the multicast address or unicast address.
10. Flight control computer system according to item 9, wherein the predetermined CAN bus communication protocol allows in case of multicast addressing of CAN bus messages that payload data of the CAN bus messages include different payload data items for the plural device bus nodes being addressed by the respective CAN bus message, wherein the device bus nodes are configured to access the respective at least one payload data item to be processed by the respective device bus node based on a message ID included in the DOC field.
11. Flight control system according to one of items 1 to 10, wherein the flight control computer system is configured to send bus messages to the device bus nodes redundantly via the electronic or optoelectronic bus system, such that each device bus node receives the bus messages on at least two of its plural communication ports.
12. Flight control system according to item 11, wherein the flight control computer system is configured to send bus messages to the device bus nodes selectively via the electronic or optoelectronic bus system, so that bus messages including commands for at least one particular device bus node are only sent via those busses to which the at least one particular device bus node is connected with at its plural communication ports.
13. Flight control system according to item 12, wherein the flight control computer system is configured such that bus messages including commands for plural device bus nodes are only sent via those busses of the electronic or optoelectronic bus system to which these plural device bus nodes are connected with at a respective of their respective plural communication ports.
14. Flight control system according to one of items 11 to 13, wherein the flight control computer system is configured such that bus messages including commands for one particular device bus node or for plural particular device bus nodes are only sent via two busses of the electronic or optoelectronic bus system.
15. Flight control system according to one of items 1 to 14, wherein each device bus node is configured to communicate with the flight control computer system via its communication ports based on different predetermined bus communication protocols that differ between the communication ports.
16. Flight control system according to one of items 1 to 15, wherein the electronic or optoelectronic bus system comprises plural independent bus subsystems (CAN A, CAN B), wherein each device bus node is connected at a first of its communication ports with an associated bus of a first bus subsystem (CAN A) and is connected at a second of its communication ports with an associated bus of a second bus sub-system (CAN B).
17. Flight control system according to item 16, wherein each device bus node is configured to communicate with the flight control computer system via the bus being associated to its first communication port on basis of a first predetermined bus communication protocol and wherein each device bus node is configured to communicate with the flight control computer system via the bus being associated to its second communication port on basis of a second predetermined bus communication protocol, that differs from the first predetermined bus communication protocol.

The applicant reserves the right to set up corresponding claims.

The invention claimed is:

1. A distributed system for an aircraft, comprising:
an electronic or optoelectronic bus system comprising a first bus sub-system and a second bus sub-system, wherein the first and second bus sub-systems are independent;
a plurality of controllers configured to control aircraft devices comprising propulsion units or control surfaces of the aircraft, wherein:
each of the plurality of controllers is communicatively connected to a unique combination of a first bus in the first bus sub-system and a second bus in the second bus sub-system, and
each of the plurality of controllers is configured to determine its identification and perform a self-configuration procedure based on receiving communications from the unique combination of buses.

2. The distributed system according to claim 1, wherein each of the plurality of controllers is configured to derive its identification based on bus allocation data.

3. The distributed system according to claim 1, wherein each of the plurality of controllers is configured to determine at least one differentiating feature that is related to an installation of an associated aircraft device of the aircraft devices.

4. The distributed system according to claim 1, wherein each of the plurality of controllers is configured to identify an associated harness configuration.

5. The distributed system according to claim 3, wherein each of the plurality of controllers is configured to derive its configuration based on a predefined allocation of busses and a supplementary differentiating feature that is reflected in the bus allocation data.

6. The distributed system according to claim 1, wherein the self-configuration procedure is based on pre-configuration data stored in a memory, and wherein the self-configuration procedure comprises:
listening to a plurality of bus messages received on at least two communication ports;
evaluating identifiers of the plurality of bus messages to identify at least one bus message that enable a self-configuration;
for each of the at least two communication ports, extracting self-configuration raw data from the at least one bus message; and
determining the configuration based on the extracted self-configuration raw data and association data of the pre-configuration data.

7. The distributed system according to claim 6, wherein the self-configuration raw data comprises bus allocation data that identifies an associated bus connected to a communication port of the at least two communication ports.

8. The distributed system according to claim 7, wherein each of the plurality of controllers is configured to store at least a part of a respective individual configuration in a memory after having performed the self-configuration.

9. A device bus node, comprising:

a controller configured to control at least one of a propulsion unit or a control surface, wherein the controller comprises:

a plurality of communication ports configured to connect to a unique combination of a first bus in a first bus sub-system and a second bus in a second bus sub-system, wherein:

the controller is configured to determine its identification and perform a self-configuration procedure based on receiving communications from the unique combination of buses.

10. The device bus node according to claim 9, wherein the controller is configured to derive the configuration of the device bus node based on bus allocation data.

11. The device bus node according to claim 9, wherein the controller is configured to determine at least one differentiating feature that is related to an installation of the at least one propulsion unit or control surface.

12. The device bus node according to claim 11, wherein the controller is configured to derive a configuration of the device bus node based on an allocation of busses to the device bus node and the at least one differentiating feature.

13. The device bus node according to claim 9, wherein the controller is configured to perform a self-configuration procedure based on pre-configuration data stored in a memory of the device bus node, wherein the self-configuration procedure comprises:

listening to a plurality of bus messages received on at least two communication ports;

evaluating identifiers of the plurality of bus messages to identify at least one bus message that enables a self-configuration;

for each of the at least two communication ports, extracting self-configuration raw data from the at least one bus message; and determining the configuration of the device bus node based on the extracted self-configuration raw data and association data of the pre-configuration data.

14. The device bus node according to claim 13, wherein the self-configuration raw data comprises bus allocation data that identifies an associated bus connected to a communication port of the at least two communication ports.

15. A method of configuring a device bus node of an aircraft device, comprising:

receiving, by each of a plurality of controllers, communication from a unique combination of a first bus in a first bus sub-system and a second bus in a second bus sub-system; and determining, by each of the plurality of controllers, its identification based on the received communication from the unique combination of buses, and performing, by each of the plurality of controllers, a self-configuration procedure based on the received communication from the unique combination of buses, wherein the plurality of controllers are configured to control aircraft devices comprising propulsion units or control surfaces of the aircraft.

16. The method according to claim 15, wherein the self-configuration procedure comprises:

listening to a plurality of bus messages received on at least two communication ports;

evaluating identifiers of the plurality of bus messages to identify at least one bus message that enables a self-configuration;

for each of the at least two communication ports, extracting self-configuration raw data from the at least one bus message;

determining the configuration of the device bus node based on the extracted self-configuration raw data and association data of pre-configuration data; and storing at least a part of individual configuration data that define the configuration of the device bus node in a memory.

17. The method according to claim 16, wherein the self-configuration procedure further comprises determining at least one differentiating feature that is related to an installation of an associated control surface or propulsion unit.

* * * * *